United States Patent
Fujishiro

(10) Patent No.: US 12,520,361 B2
(45) Date of Patent: Jan. 6, 2026

(54) USER EQUIPMENT, NODE, AND COMMUNICATION METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 19/224,210

(22) Filed: May 30, 2025

(65) Prior Publication Data
US 2025/0294634 A1 Sep. 18, 2025

Related U.S. Application Data

(63) Continuation of application No. PCT/JP2023/014683, filed on Apr. 11, 2023.

(51) Int. Cl.
| | |
|---|---|
| *H04W 76/15* | (2018.01) |
| *H04W 24/08* | (2009.01) |
| *H04W 24/10* | (2009.01) |
| *H04W 76/20* | (2018.01) |

(52) U.S. Cl.
CPC ........... *H04W 76/15* (2018.02); *H04W 24/08* (2013.01); *H04W 24/10* (2013.01); *H04W 76/20* (2018.02)

(58) Field of Classification Search
CPC ..... H04W 76/15; H04W 76/19; H04W 76/10; H04W 76/20; H04W 76/27; H04W 24/08; H04W 24/10; H04W 24/04; H04W 24/02
See application file for complete search history.

(56) References Cited

U.S. PATENT DOCUMENTS

| | | | |
|---|---|---|---|
| 12,035,393 B2 | 7/2024 | Yilmaz et al. | |
| 12,126,577 B2 | 10/2024 | Svedman et al. | |
| 12,262,275 B2 | 3/2025 | Deenoo et al. | |
| 12,464,597 B2 * | 11/2025 | Shimoda | H04B 7/06964 |

(Continued)

FOREIGN PATENT DOCUMENTS

| | | |
|---|---|---|
| JP | 2015-012618 A | 1/2015 |
| JP | 2017-514367 A | 6/2017 |

(Continued)

OTHER PUBLICATIONS

3rd Generation Partnership Project; Technical Specification Group Radio Access Network; NR; NR and NG-RAN Overall Description; Stage 2 (Release 17); 3GPP TS 38.300 V17.3.0; Dec. 2022; pp. 1-210.

(Continued)

*Primary Examiner* — Mong-Thuy T Tran
(74) *Attorney, Agent, or Firm* — Studebaker Brackett PLLC

(57) ABSTRACT

A user equipment that performs wireless communication with a master node and a secondary node by using dual connectivity in a mobile communication system includes: a receiver configured to receive, from the master node, information indicating a radio quality condition to be satisfied for the user equipment to perform activation processing for a secondary cell group of the secondary node; and a controller configured to measure radio quality for the secondary cell group and evaluate whether the radio quality condition is satisfied. The controller performs the activation processing for the secondary cell group in response to the radio quality condition being satisfied.

13 Claims, 14 Drawing Sheets

(56) References Cited

U.S. PATENT DOCUMENTS

| | | | |
|---|---|---|---|
| 2012/0176926 A1* | 7/2012 | Jang | H04W 24/10 |
| | | | 370/252 |
| 2015/0003266 A1 | 1/2015 | Guo | |
| 2015/0003345 A1 | 1/2015 | Kuo | |
| 2015/0032553 A1 | 1/2015 | Thaler et al. | |
| 2016/0338139 A1* | 11/2016 | Kwon | H04W 76/27 |
| 2017/0228753 A1 | 8/2017 | Thaler et al. | |
| 2022/0007391 A1 | 1/2022 | Höglund et al. | |
| 2022/0030659 A1* | 1/2022 | Kim | H04W 28/06 |
| 2022/0117022 A1* | 4/2022 | Cheng | H04W 76/19 |
| 2023/0122107 A1* | 4/2023 | Zhang | H04W 76/34 |
| | | | 370/329 |
| 2023/0164843 A1 | 5/2023 | Wang et al. | |
| 2024/0414795 A1 | 12/2024 | Yilmaz et al. | |
| 2025/0023702 A1 | 1/2025 | Svedman et al. | |
| 2025/0150874 A1* | 5/2025 | Kim | H04L 5/001 |
| 2025/0330995 A1* | 10/2025 | Kim | H04W 72/23 |

FOREIGN PATENT DOCUMENTS

| | | |
|---|---|---|
| JP | 2022-501935 A | 1/2022 |
| JP | 2022-518400 A | 3/2022 |
| JP | 2022-525766 A | 5/2022 |
| JP | 2022-550176 A | 11/2022 |
| JP | 2023-522093 A | 5/2023 |
| WO | 2021/215984 A1 | 10/2021 |
| WO | 2023/013028 A1 | 2/2023 |

OTHER PUBLICATIONS

Change Request; "Running CR for QoE enhancements in NR"; 3GPP TSG-RAN WG2 Meeting #121bis-e; R2-2303676; Electronic Meeting; Apr. 17-26, 2023; pp. 1-1304.

Office Action issued in JP 2023-214933; mailed by the Japanese Patent Office on Jun. 25, 2024.

Office Action issued in JP 2023-214933; mailed by the Japanese Patent Office on Mar. 18, 2025.

* cited by examiner

USER EQUIPMENT, NODE, AND COMMUNICATION METHOD

RELATED APPLICATION

The present application is a continuation based on PCT Application No. PCT/JP2023/014683, filed on Apr. 11, 2023. The content of which is incorporated by reference herein in their entirety.

TECHNICAL FIELD

The present disclosure relates to a user equipment, a node, and a communication method.

BACKGROUND

The 3rd generation partnership project (3GPP (registered trademark; the same applies hereinafter)), which is a standardization project for mobile communication systems, defines technical specifications for dual connectivity (DC). In DC, a user equipment (UE) performs wireless communication with a master cell group (MCG) of a master node (MN) and a secondary cell group (SCG) of a secondary node (SN).

In each of the MCG and SCG, a plurality of component carriers (CCs) corresponding to a plurality of serving cells are aggregated, and a UE can simultaneously receive or transmit on a plurality of CCs (a plurality of cells). The plurality of CCs may be contiguous or discontinuous in the frequency direction. One serving cell of each of the MCG and SCG is referred to as a primary cell (PCell), and a set of serving cells is formed by configuring one or more secondary cells (SCells) together with the PCell to a UE. Note that the PCell is also referred to as an SpCell. The PCell (SpCell) of the SCG is also referred to as a PSCell.

Release 17 of the 3GPP standard introduces the specification for deactivation of SCGs. The activation of an SCG that has been set to a deactive state is generally performed in the following procedure. First, the UE transmits a measurement report message including a measurement result of the radio quality of each cell to the MN. Second, the MN instructs the UE to activate the SCG by using a radio resource control (RRC) message. Third, the UE activates the SCG in response to the indication. Activating an SCG transitions the SCG from a deactive state to an active state, enabling wireless communication using the SCG.

This type of control has the problem that it is difficult to shorten the time from when the radio quality for the SCG improves in the UE until when wireless communication using the SCG becomes possible.

CITATION LIST

Non-Patent Literature

Non-Patent Document 1: 3GPP technical specification: TS 38.300 V17.3.0 (2022-12)

SUMMARY

A user equipment according to a first aspect is equipment that performs wireless communication with a master node and a secondary node by using dual connectivity in a mobile communication system. The user equipment includes: a receiver configured to receive, from the master node, information indicating a radio quality condition to be satisfied for the user equipment to perform activation processing for a secondary cell group of the secondary node; and a controller configured to measure radio quality for the secondary cell group and evaluate whether the radio quality condition is satisfied. The controller performs the activation processing for the secondary cell group in response to the radio quality condition being satisfied.

A node according to a second aspect is a node that operates as a master node in a mobile communication system in which a user equipment performs wireless communication with the master node and a secondary node by using dual connectivity. The node includes: a controller configured to configure a secondary cell group of the secondary node to the user equipment; and a transmitter configured to transmit, to the user equipment, information indicating a radio quality condition to be satisfied for the user equipment to perform activation processing for the secondary cell group.

A communication method according to a third aspect is a method to be used in a user equipment that performs wireless communication with a node by using dual connectivity in a mobile communication system. The communication method includes: receiving, from the node, information indicating a radio quality condition to be satisfied for the user equipment to perform activation processing for a secondary cell group to be configured to the user equipment; measuring radio quality for the secondary cell group and evaluating whether the radio quality condition is satisfied; and performing the activation processing for the secondary cell group in response to the radio quality condition being satisfied.

A communication method according to a fourth aspect is a method to be used in a node that performs wireless communication with a user equipment by using dual connectivity in a mobile communication system. The communication method includes: configuring a secondary cell group to the user equipment; and transmitting, to the user equipment, information indicating a radio quality condition to be satisfied for the user equipment to perform activation processing for the secondary cell group.

DESCRIPTION OF EMBODIMENTS

Figure 1:
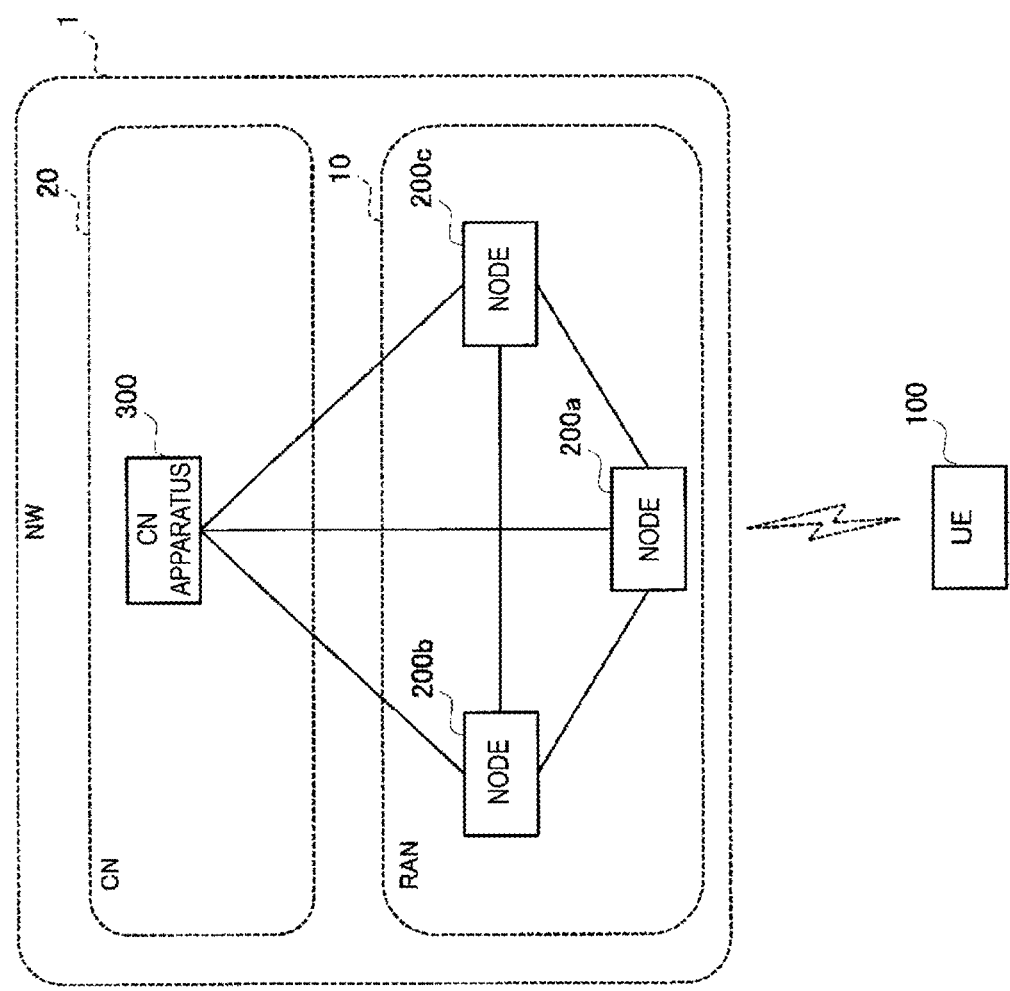
FIG. 1 is a diagram illustrating a configuration example of a mobile communication system according to an embodiment.

A mobile communication system according to embodiments will be described below with reference to the drawings. In the description of the drawings, the same or similar parts are denoted by the same or similar reference numerals.

(1) First Embodiment

A first embodiment will be described with reference to FIGS. 1 to 9.

(1.1) System Configuration Example

FIG. 1 is a diagram illustrating a configuration example of a mobile communication system according to an embodiment. The mobile communication system according to the embodiment is a system conforming to the 3GPP standard. For example, the mobile communication system according to the embodiment may be a 5th generation (5G) system or a 6th generation (6G) system.

The mobile communication system includes a network (NW) 1 and a user equipment (UE) 100. The UE 100 is a mobile communication apparatus and performs wireless communication with the NW 1. The UE 100 may be an apparatus used by a user and may be, for example, a mobile phone terminal (including a smartphone), a tablet terminal, a laptop personal computer (PC), a communication module (including a communication card or chipset), a sensor or an apparatus provided in a sensor, a vehicle or an apparatus provided in a vehicle (a vehicle UE), or an aircraft or an apparatus provided in an aircraft (an aerial UE).

The NW 1 includes a radio access network (RAN) 10 and a core network (CN) 20. When the mobile communication system is a 5th generation system (5GS), the RAN 10 is referred to as a next generation radio access network (NG-RAN) and the CN 20 is referred to as a 5G core network (5GC).

The RAN 10 includes a plurality of nodes 200 (nodes 200a to 200c in the illustrated example). The nodes 200 are connected to each other via inter-node interfaces. The node 200 is also referred to as a base station. The node 200 may be configured (that is, functionally divided) into a central unit (CU) and a distributed unit (DU), and both units may be connected by a fronthaul interface. When the mobile communication system is a 5GS, the node 200 is referred to as a gNB, the inter-node interface is referred to as an Xn interface, and the fronthaul interface is referred to as an F1 interface.

Each node 200 manages one or more cells. The node 200 performs wireless communication with the UE 100 that has established a connection with its own cell. Each node 200 has a radio resource management (RRM) function, a routing function for user data (also simply referred to as "data"), a measurement control function for mobility control and scheduling, and the like. Note that a "cell" is used as a term indicating a minimum unit of a wireless communication area. The "cell" is also used as a term indicating a function or a resource for performing wireless communication with the UE 100. One cell belongs to one carrier frequency (also simply referred to as a "frequency").

The CN 20 includes a CN apparatus 300. The CN apparatus 300 may include a control plane (C-plane) apparatus corresponding to the C-plane, and a user plane (U-plane) apparatus corresponding to the U-plane. The C-plane apparatus performs various mobility control, paging, and the like for the UE 100. The C-plane apparatus communicates with the UE 100 by using non-access stratum (NAS) signaling. The U-plane apparatus controls the transfer of data. When the mobile communication system is a 5GS, the C-plane apparatus is referred to as an access and mobility management function (AMF), the U-plane apparatus is referred to as a user plane function (UPF), and the interface between the node 200 and the CN apparatus 300 is referred to as an NG interface.

Figure 2:
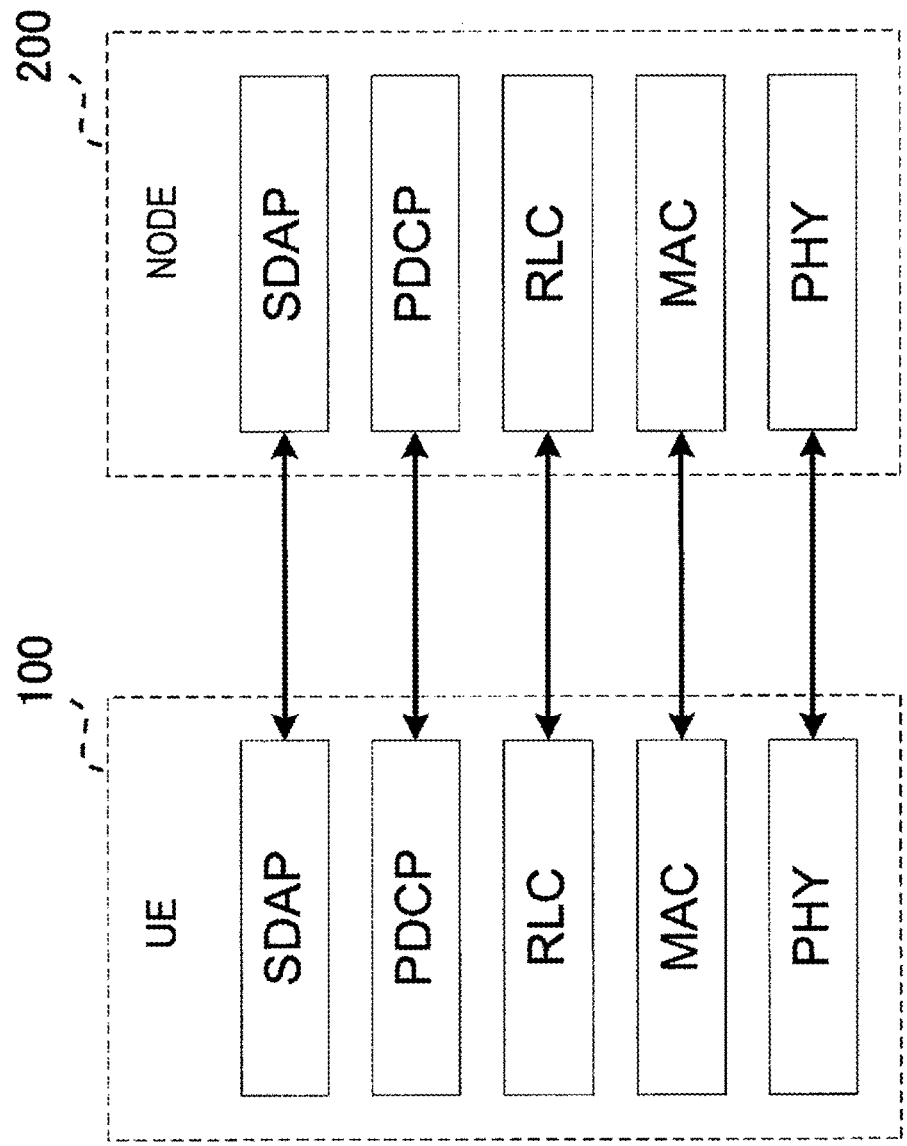
FIG. 2 is a diagram illustrating a configuration example of a protocol stack of a U-plane radio interface that handles data.

FIG. 2 is a diagram illustrating a configuration example of a protocol stack of a U-plane radio interface that handles data.

The protocol of the U-plane radio interface includes, for example, a physical (PHY) layer, a medium access control (MAC) layer, a radio link control (RLC) layer, a packet data convergence protocol (PDCP) layer, and a service data adaptation protocol (SDAP) layer.

The PHY layer performs encoding/decoding, modulation/demodulation, antenna mapping/demapping, and resource mapping/demapping. Data and control information are transmitted between the PHY layer of the UE 100 and the PHY layer of the node 200 via a physical channel. Note that the PHY layer of the UE 100 receives downlink control information (DCI) transmitted from the node 200 on a physical downlink control channel (PDCCH). Specifically, the UE 100 performs blind decoding of the PDCCH by using a radio network temporary identifier (RNTI) and acquires a successfully decoded DCI as a DCI addressed to the UE. The DCI transmitted from the node 200 has CRC parity bits scrambled by the RNTI added thereto.

The MAC layer performs data priority control and retransmission processing using Hybrid ARQ (HARQ), and the like. Data and control information are transmitted between the MAC layer of UE 100 and the MAC layer of node 200 via a transport channel. The MAC layer of the node 200 includes a scheduler. The scheduler determines the uplink and downlink transport format (transport block size, modulation and coding scheme (MCS)) and the resources to be allocated to the UE 100.

The RLC layer uses the functions of the MAC layer and the PHY layer to transmit data to the RLC layer on the receiving side. Data and control information are transmitted between the RLC layer of the UE 100 and the RLC layer of the node 200 via a logical channel.

The PDCP layer performs header compression/decompression, encryption/decryption, and the like.

The SDAP layer performs mapping between an IP flow, which is a unit for QoS control by the CN 20, and a radio bearer, which is a unit for QoS control by an access stratum (AS). Note that, when the RAN is connected to an EPC, the SDAP may be eliminated.

Figure 3:
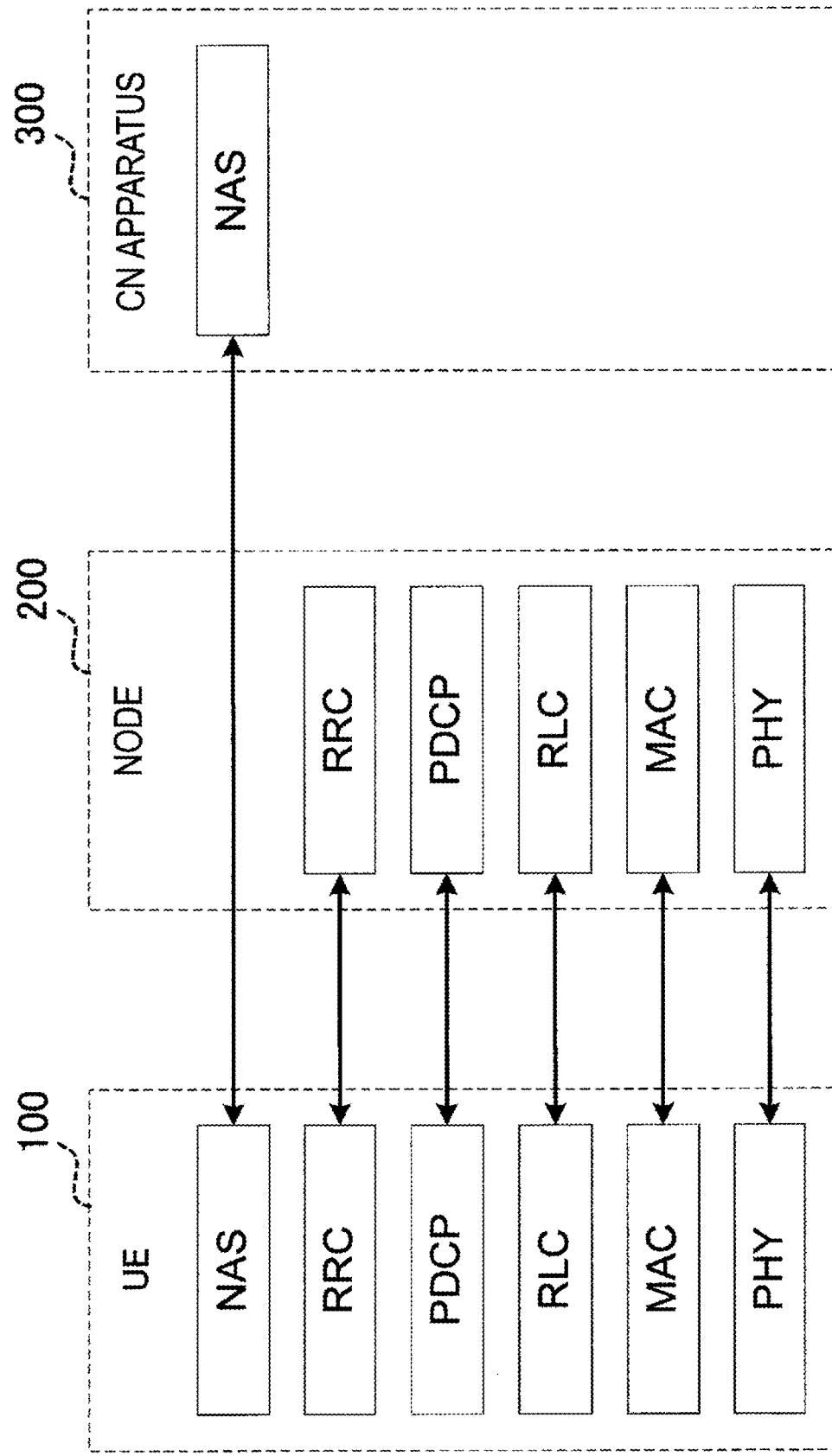
FIG. 3 is a diagram illustrating a configuration example of a protocol stack of a C-plane radio interface that handles signaling (control signal).

FIG. 3 is a diagram illustrating a configuration example of a protocol stack of a C-plane radio interface that handles signaling (control signal).

The protocol stack of the C-plane radio interface includes, for example, a radio resource control (RRC) layer and a non-access stratum (NAS) layer instead of the SDAP layer illustrated in FIG. 2.

RRC signaling for various settings is transmitted between the RRC layer of the UE 100 and the RRC layer of the node

200. The RRC layer controls the logical channel, the transport channel, and the physical channel according to the establishment, re-establishment and release of radio bearers. When there is a connection (RRC connection) between the RRC of the UE 100 and the RRC of the node 200, the UE 100 is in an RRC connected state. When there is no connection (RRC connection) between the RRC of the UE 100 and the RRC of the node 200, the UE 100 is in an RRC idle state. When the connection between the RRC of the UE 100 and the RRC of the node 200 is suspended, the UE 100 is in an RRC inactive state.

The NAS layer (also simply referred to as "NAS"), which is located above the RRC layer, performs session management, mobility management, and the like. NAS signaling is transmitted between the NAS layer of the UE 100 and the NAS layer of the CN apparatus 300. Note that the UE 100 has an application layer and the like in addition to the radio interface protocol. The layer below the NAS layer is referred to as an AS layer (also simply referred to as "AS").

(1.2) DC Using Terahertz Wave Cell

Figure 4:
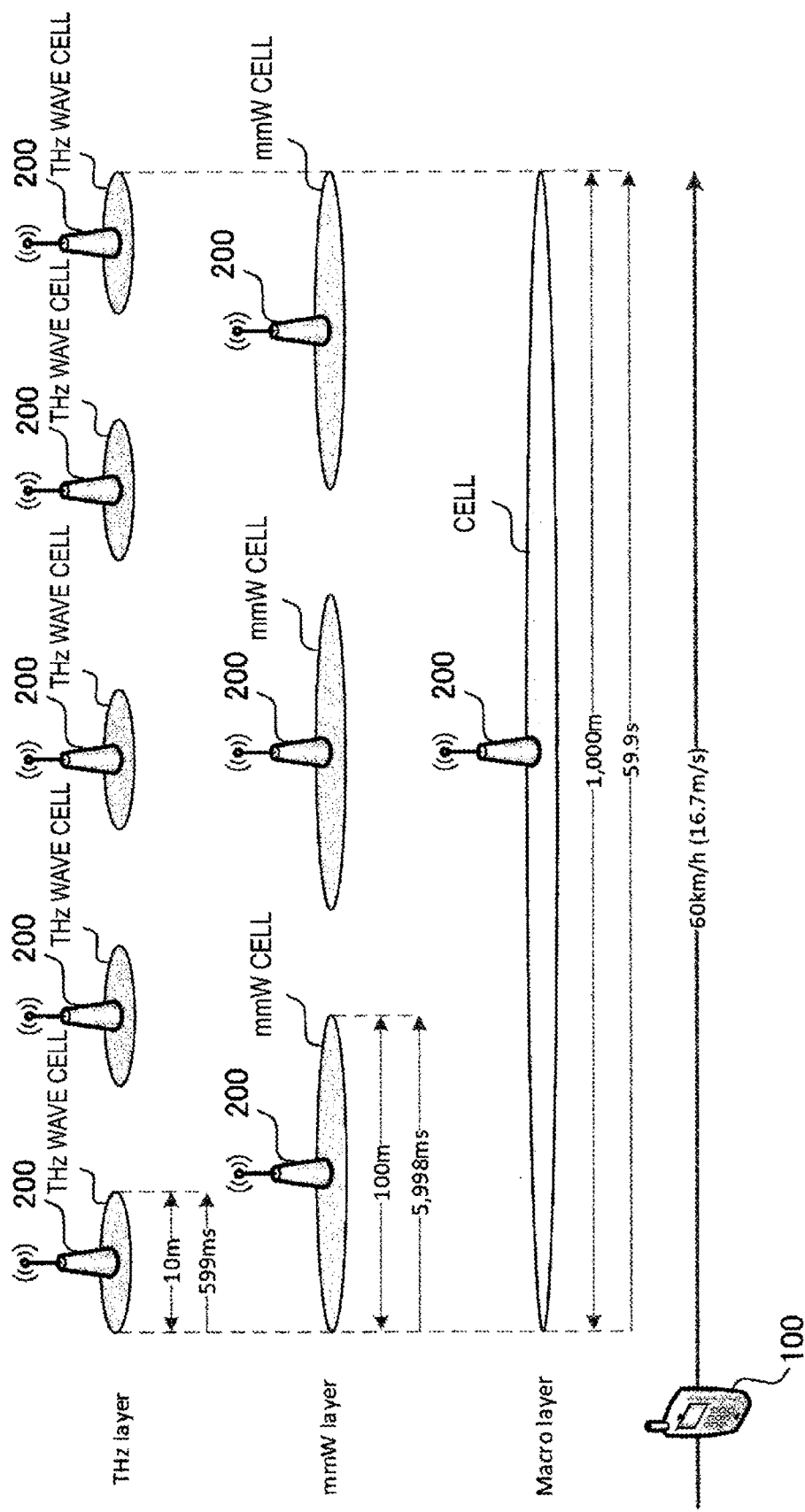
FIG. 4 is a diagram for describing a terahertz (THz) wave cell according to the embodiment.

FIG. 4 is a diagram for describing a terahertz (THz) wave cell according to the embodiment.

The mobile communication system according to the embodiment may be a 6G system. 6G is assumed to utilize terahertz (THz) waves. A cell operated by THz waves is referred to as a THz wave cell. Compared with millimeter waves (mmW), THz waves have a stronger tendency to have a straighter direction of travel, have a higher free space loss, and are more susceptible to the effects of the atmosphere and precipitation. Therefore, the THz wave cell can be an extremely small cell.

In the illustrated example, the diameter of the coverage area of the THz wave cell is approximately 10 m, the diameter of the coverage area of the mmW cell operated at mmW is approximately 100 m, and the diameter of the coverage area of the macro cell is approximately 1000 m. Under such assumptions, for example, the UE 100 moving at 60 [km/s] passes through the coverage area of each THz wave cell in approximately 599 [ms].

Figure 5:
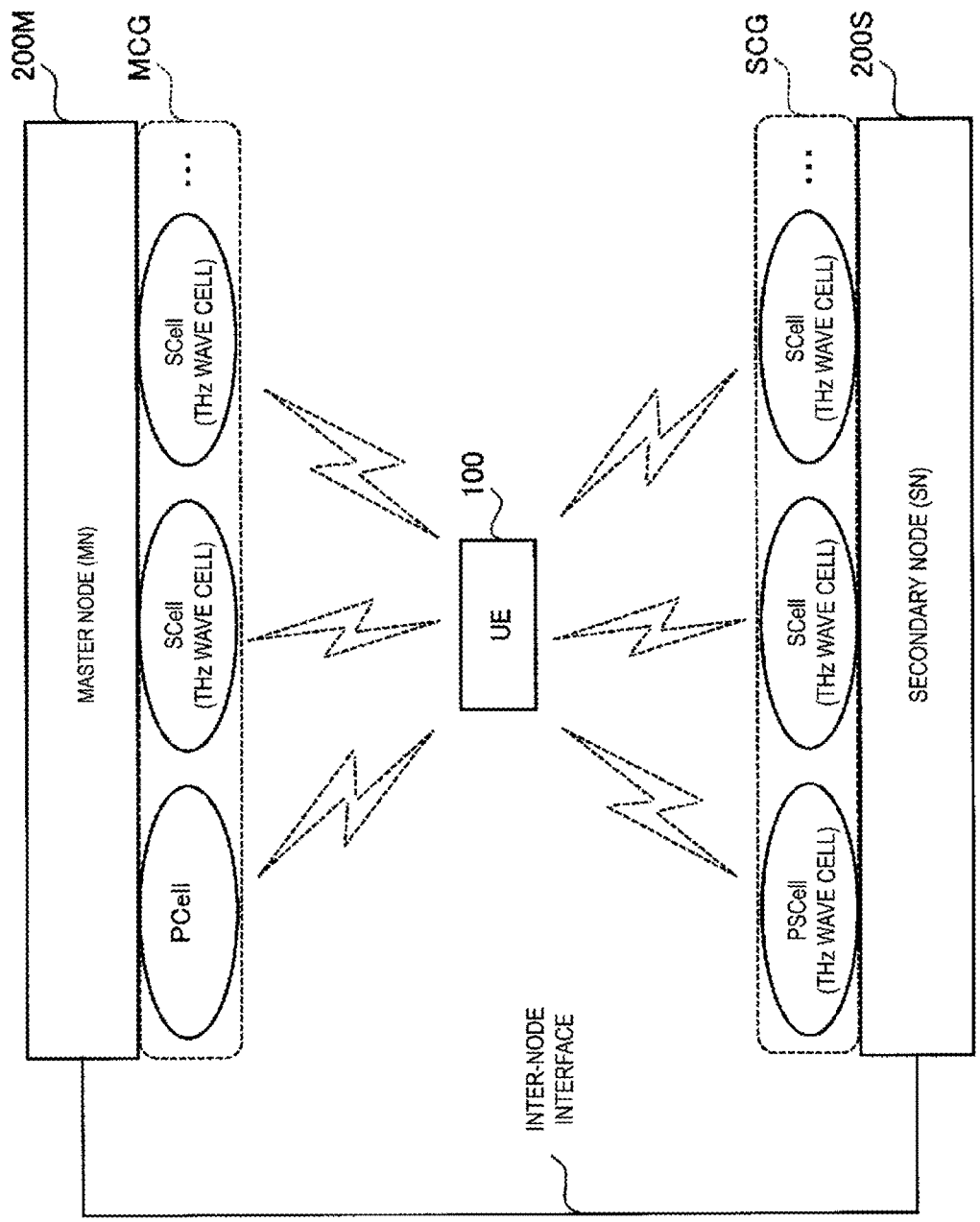
FIG. 5 is a diagram for describing dual connectivity (DC) according to the embodiment.

Dual connectivity (DC) is one method for stably controlling small cells in a mobile communication system. FIG. 5 is a diagram for describing dual connectivity (DC) according to the embodiment. In the embodiment, it is assumed that the THz wave cell is used as a cell of a secondary cell group (SCG). The THz wave cell may be used as a secondary cell (SCell) of a master cell group (MCG). However, instead of the THz wave cell, a mmW cell may be used.

DC may be configured to the UE 100 in the RRC connected state. In the DC, the UE 100 performs wireless communication with a master cell group (MCG) managed by a master node (MN) 200M and a secondary cell group (SCG) managed by a secondary node (SN). The MN 200M and the SN 200S are connected to each other via an inter-node interface. When not being distinguished, the MN 200M and the SN 200S are simply referred to as the node 200. When being a 5G/NR node, the MN 200M is also referred to as a master gNB (MgNB). When being a 5G/NR node, the SN 200S is also referred to as a secondary gNB (SgNB).

For example, the MN 200M transmits a predetermined message (for example, an SN Addition Request message) to the SN 200S, and the MN 200M transmits an RRC Reconfiguration message to the UE 100, so that an SCG is configured in the UE 100 and DC is started. In DC, a radio resource is allocated to the UE 100 in the RRC connected state from the scheduler of each of the MN 200M and the SN 200S, and the UE 100 performs wireless communication by using the radio resource of the MN 200M and the radio resource of the SN 200S.

The MN 200M may have a control plane connection with the CN 20. The MN 200M provides a main radio resource for the UE 100. The MN 200M manages an MCG, which is a group of serving cells associated with the MN 200M. An MCG has a primary cell (PCell) and optionally one or more secondary cells (SCells). On the other hand, the SN 200S may not have a control plane connection with the CN 20. The SN 200S provides an additional radio resource to the UE 100. The SN 200S manages an SCG, which is a group of serving cells associated with the SN 200S. An SCG has a primary secondary cell (PSCell) and optionally one or more SCells. Note that the PCell of the MCG 201M and the PSCell of the SCG 201S are sometimes referred to as special cells (SpCells).

The mobile communication system supports activation and deactivation of the SCG to enable reduction of power consumption of the UE 100 in which DC is configured. Activation/deactivation of the SCG can be indicated by an RRC Reconfiguration message from the MN 200M to the UE 100. While the SCG is deactivated, all SCG SCells are in the deactive state. While the SCG is deactivated, the UE 100 does not need to transmit a physical uplink shared channel (PUSCH), a sounding reference signal (SRS), and a channel quality indicator (CSI) report on the SCG, and while the SCG is deactivated, the UE 100 does not need to monitor a physical downlink shared channel (PDCCH) or receive a downlink shared channel (DL-SCH) on the SCG. However, the UE 100 can continue radio link monitoring (RLM) and measurement reporting for the PSCell. When activating the SCG, the UE 100 can skip the random access procedure if the timing advance (TA) with the PSCell is valid.

Figure 6:
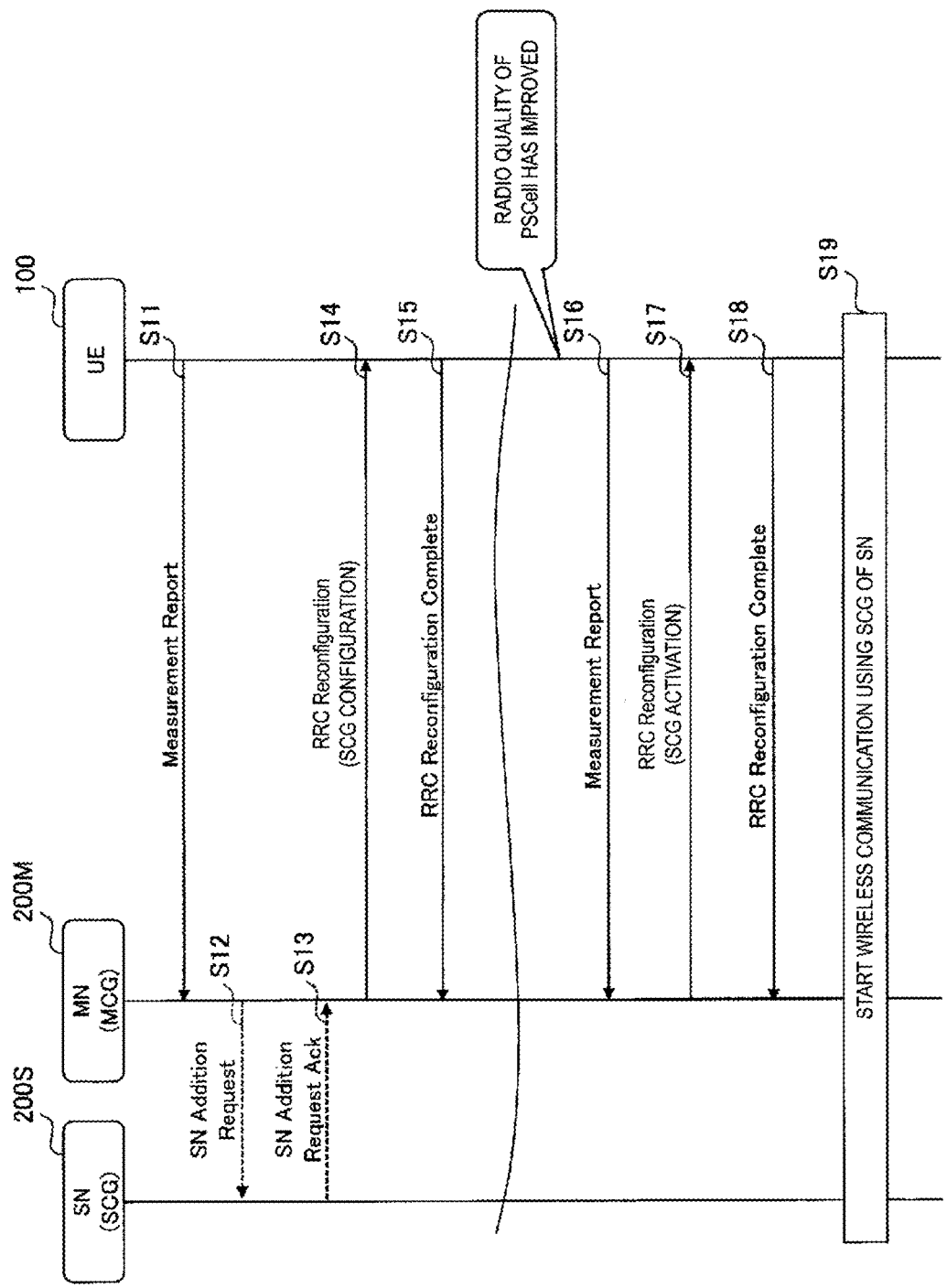
FIG. 6 is a diagram illustrating a general procedure for configuring and activating an SCG.

FIG. 6 is a diagram illustrating a general procedure for configuring and activating an SCG.

In step S11, the UE 100 transmits a Measurement Report message including the measurement result of the radio quality of each cell to the MN 200M. The radio quality is, for example, at least one selected from the group consisting of reference signal received power (RSRP), reference signal received quality (RSRQ), and signal to interference & noise ratio (SINR). The Measurement Report message is an RRC message transmitted and received in the RRC layer. The Measurement Report message may be transmitted periodically or in response to an event trigger. The MN 200M receives the Measurement Report message. The MN 200M determines, based on the Measurement Report message, to configure an SCG in the UE 100.

In step S12, the MN 200M may transmit an S-Node (SN) Addition Request message to the SN 200S to request preparation of resources for DC operation for the UE 100.

In step S13, in response to receiving the SN Addition Request message, the SN 200S may transmit an S-Node (SN) Addition Request Acknowledge (Ack) message to the MN 200M to acknowledge the preparation of resources for DC operation for the UE 100.

In step S14, the MN 200M transmits an RRC Reconfiguration message to the UE 100 to configure an SCG in the UE 100. The RRC Reconfiguration message is an RRC message transmitted and received in the RRC layer. The UE 100 receives the RRC Reconfiguration message. Here, it is assumed that the initial state of the SCG is the deactive state.

In step S15, the UE 100 transmits an RRC Reconfiguration Complete message indicating that the configuration (addition) of the SCG based on the RRC Reconfiguration message has been completed to the MN 200M. The RRC Reconfiguration Complete message is an RRC message transmitted and received in the RRC layer. The MN 200M receives the RRC Reconfiguration Complete message.

Thereafter, it is assumed that the radio quality of the SCG (PSCell) improves in the UE 100, and the radio quality of the SCG (PSCell) becomes capable of communication.

In step S16, the UE 100 transmits a Measurement Report message including the measurement result of the radio quality of the PSCell to the MN 200M. The UE 100 may transmit a Measurement Report message to the MN 200M triggered by the better radio quality of the PSCell. The MN 200M receives the Measurement Report message.

In step S17, the MN 200M transmits an RRC Reconfiguration message to the UE 100 to activate the SCG. The UE 100 receives the RRC Reconfiguration message and starts activation of the SCG. The activation processing of the SCG includes communication preparation such as channel state information (CSI) measurement, automatic gain control (AGC), and beam management.

In step S18, the UE 100 transmits the RRC Reconfiguration Complete message to the MN 200M. The MN 200M receives the RRC Reconfiguration Complete message.

In step S19, the UE 100 starts wireless communication (data communication) with the SN 200S by using the activated SCG.

According to such a procedure, it takes a long time from when the radio quality of the SCG (PSCell) becomes communicable until the UE 100 can use the SCG. When the cell of the SCG is a THz wave cell, since the coverage area of the cell becomes even narrower due to the effects of shielding, etc., the time during which the SCG can be used is short. Therefore, the procedure of FIG. 6 has a problem in that it takes a long time until activation of the SCG is completed, shortening the time during which data can actually be transmitted and received on the SCG.

Meanwhile, Release 17 of the 3GPP standard introduces a conditional PSCell addition (CPA) specification. In CPA, the MN 200M configures a candidate cell for a PSCell and an execution condition for adding the candidate cell to the UE 100, and when the execution condition is satisfied, the UE 100 adds the candidate cell as a PSCell. Thus, the SN addition can be quickly executed. However, in CPA, after adding a PSCell, additional processing is required to add an SCell of an SCG, and it still takes a long time when a plurality of serving cells are configured as an SCG. In CPA, when an SCG (PSCell) has already been configured and is in a deactive state, activating the SCG requires the transmission of an RRC Reconfiguration message from the MN 200M. In order for the MN 200M to transmit this RRC Reconfiguration message, it is necessary for the MN 200M to know the radio state of the SCG by a Measurement Report message from the UE 100. In contrast, according to the conditional SCG activation according to the present embodiment, it is possible to eliminate delays caused by transmitting and receiving measurement report messages and RRC Reconfiguration messages.

Configuring the SCG in advance and maintaining the SCG in an active state allows a delay of activation of the SCG to be eliminated but may increases the power consumption of the UE 100. Therefore, a method that can deactivate the SCG (PSCell) when the radio quality of the SCG (PSCell) does not satisfy a predetermined quality and quickly activate the SCG when the radio quality of the SCG (PSCell) satisfies the predetermined quality is desired. In the following first embodiment, a method and operation capable of shortening the time required for activating an SCG will be mainly described.

(1.3) Configuration Example of User Equipment

Figure 7:
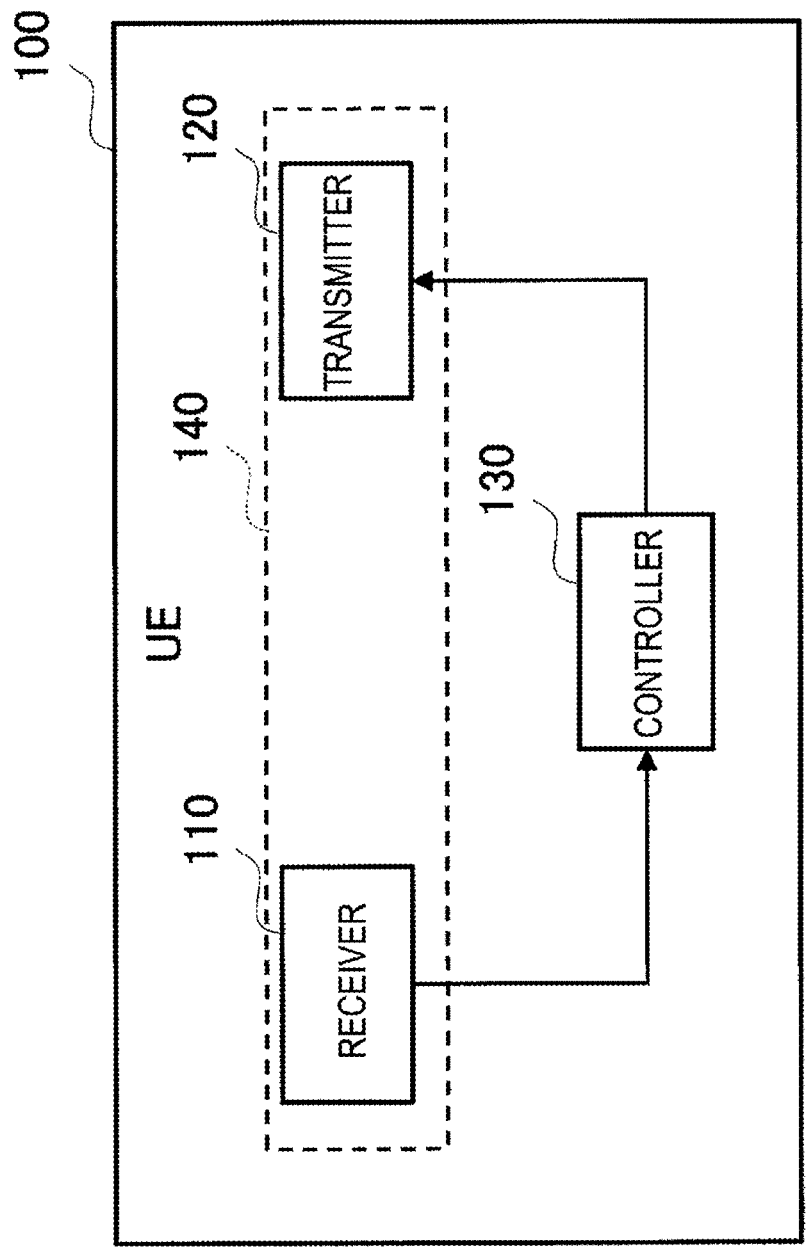
FIG. 7 is a diagram illustrating a configuration example of a UE (user equipment) according to the embodiment.

FIG. 7 is a diagram illustrating a configuration example of a UE 100 (user equipment) according to the embodiment.

The UE 100 includes a receiver 110, a transmitter 120, and a controller 130. The receiver 110 and the transmitter 120 constitute a wireless communicator 140 that performs wireless communication with the node 200.

The receiver 110 performs various types of reception under control of the controller 130. The receiver 110 includes an antenna and a reception device. The reception device converts a radio signal received by the antenna into a baseband signal (a reception signal) and outputs the resulting signal to the controller 130. The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal from an antenna.

The controller 130 performs various controls and processes in the UE 100. The operations of the UE 100 described above and below may be operations under the control of a controller 230. The controller 130 includes at least one processor and at least one memory. The memory stores a program to be executed by the processor and information to be used in processing performed by the processor. The processor may include a baseband processor and a central processing unit (CPU). The baseband processor performs modulation/demodulation and encoding/decoding of the baseband signal. The CPU executes programs stored in the memory to perform various processes.

The UE 100 configured in this manner performs wireless communication with the MN 200M and the SN 200S by using DC. The receiver 110 receives, from the MN 200M, information indicating a radio quality condition to be satisfied for the UE 100 to perform activation processing for the SCG of the SN 200S. The controller 130 measures the radio quality of the SCG (PSCell) and evaluates whether the radio quality condition is satisfied. Then, the controller 130 performs activation processing for the SCG in response to the radio quality condition being satisfied. In the first embodiment, the activation processing includes processing of causing an SCG in a deactive state to transition to an active state. Thus, when the radio quality of the SCG (PSCell) satisfies the radio quality condition (predetermined quality), the UE 100 can autonomously perform the activation processing for the SCG. Therefore, it is possible to speed up activation of the SCG.

The activation processing may include processing of leaving a bandwidth portion (BWP) in a dormant state in a PSCell that is a primary cell of the SCG. An example in which the dormant BWP is used will be described in a second embodiment.

In the embodiment, the transmitter 120 transmits a notification regarding the activation processing to the node 200 in response to the radio quality condition being satisfied. This allows the node 200 to know, based on the notification, that the UE 100 performs the activation processing. Therefore, wireless communication using the activated SCG can be smoothly started.

(1.4) Configuration Example of Node

Figure 8:
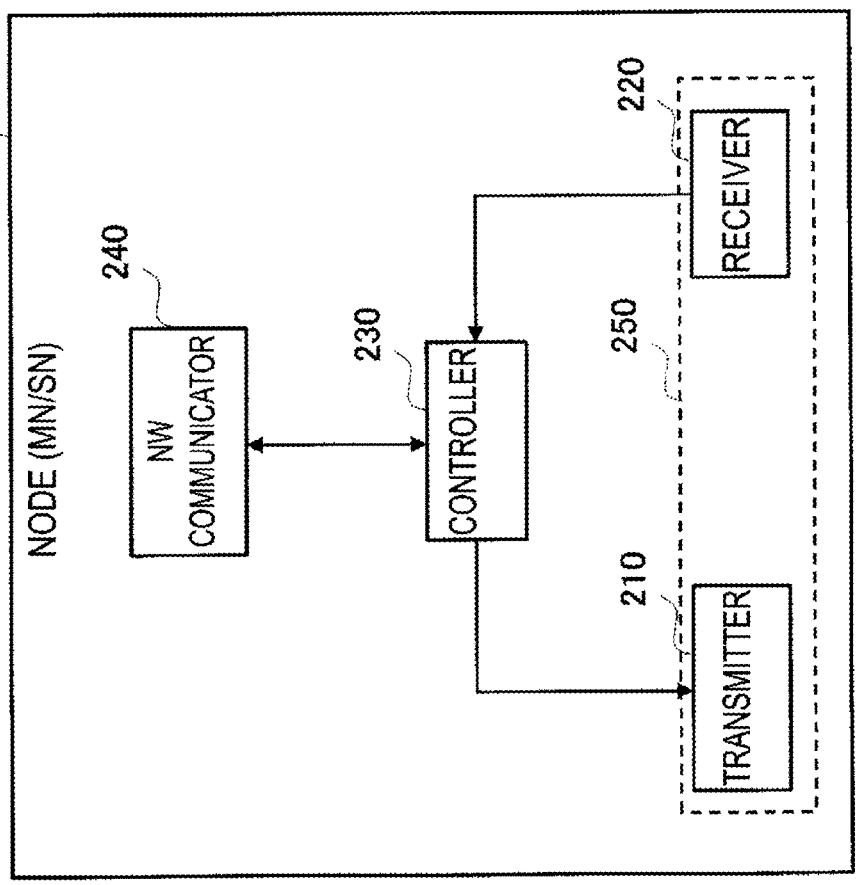
FIG. 8 is a diagram illustrating a configuration example of a node according to the embodiment.

FIG. 8 is a diagram illustrating a configuration example of a node 200 (base station) according to the embodiment. The node 200 may be an MN 200M or an SN 200S.

The node 200 includes a transmitter 210, a receiver 220, a controller 230, and an NW communicator 240. The transmitter 210 and the receiver 220 constitute a wireless communicator 250 that performs wireless communication with the UE 100.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal from an antenna. The receiver 220 performs various types of reception under control of the controller 230. The receiver 220 includes an antenna and a reception device. The reception device converts a radio signal received by the antenna into a baseband signal (a reception signal) and outputs the resulting signal to the controller 230.

The controller 230 performs various controls and processes in the node 200. The operations of the node 200 described above and below may be operations under the control of the controller 230. The controller 230 includes at least one processor and at least one memory. The memory stores a program to be executed by the processor and information to be used in processing performed by the processor. The processor may include a baseband processor and a CPU. The baseband processor performs modulation/demodulation and encoding/decoding of the baseband signal. The CPU executes programs stored in the memory to perform various processes.

The NW communicator 240 is connected to adjacent nodes via an inter-node interface. The NW communicator 240 is connected to the CN apparatus 300 via a node-CN interface.

The node 200 configured in this manner operates as the MN 200M in a mobile communication system in which the UE 100 performs wireless communication with the MN 200M and the SN 200S by using DC. The controller 230 configures the SCG of the SN 200S in the UE 100. The transmitter 210 transmits, to the UE 100, information indicating a radio quality condition to be satisfied for the UE 100 to perform activation processing for the SCG. Thus, when the radio quality of the SCG satisfies the radio quality condition (predetermined quality), the UE 100 can autonomously perform the activation processing for the SCG.

In the embodiment, the receiver 220 receives a notification regarding the activation processing from the UE 100 in response to the radio quality condition being satisfied in the UE 100. This allows the node 200 (MN 200M) to know, based on the notification, that the UE 100 performs the activation processing.

(1.5) Operation Example of System

Figure 9:
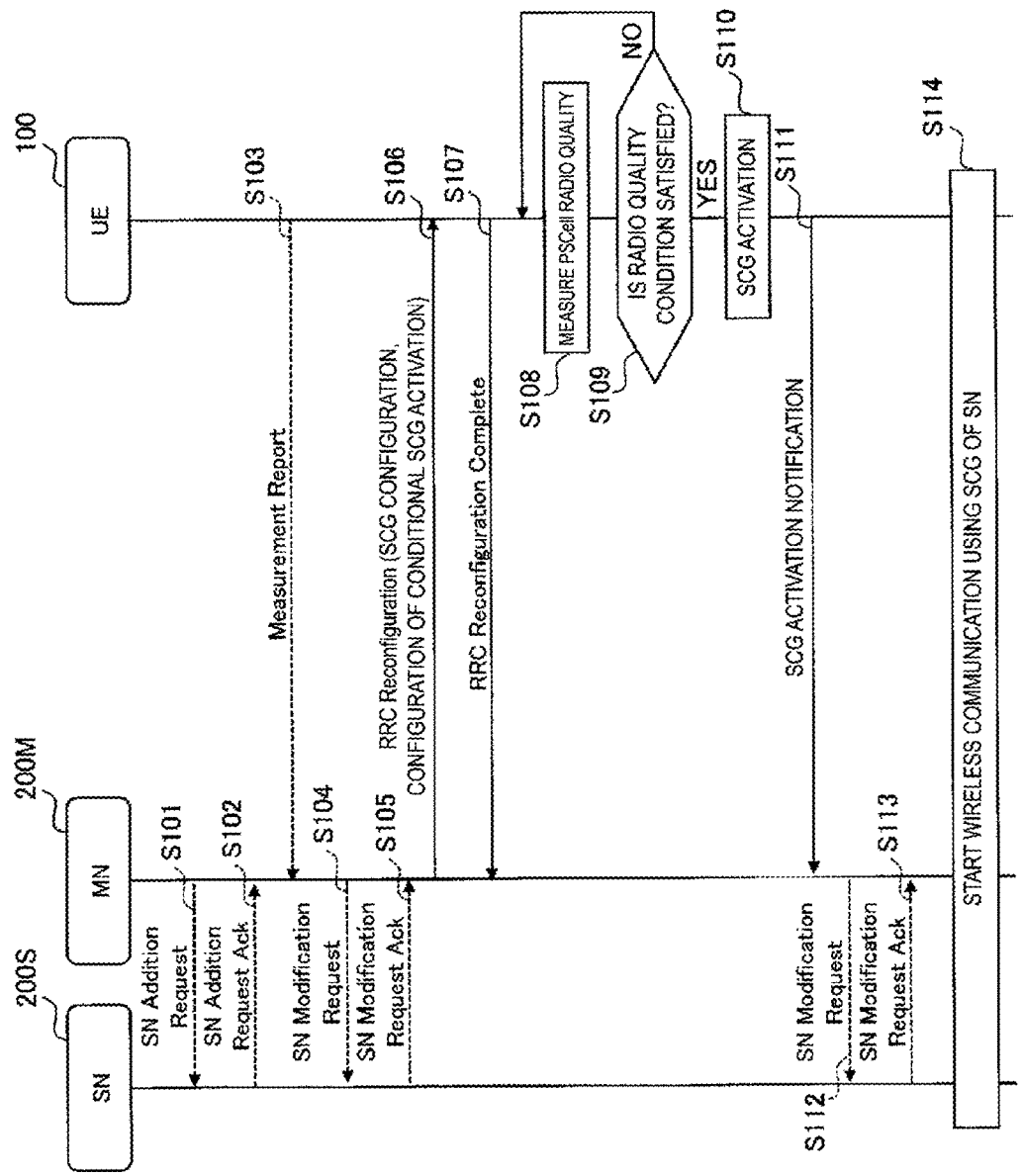
FIG. 9 is a diagram illustrating an operation example of a system according to a first embodiment.

FIG. 9 is a diagram illustrating an operation example of a system according to the first embodiment. In FIG. 9, non-essential steps are indicated by dashed lines. Duplicated descriptions of operations similar to those in FIG. 6 will be omitted.

In step S101, the MN 200M may transmit an SN Addition Request message to the SN 200S to request preparation of resources for DC operation for the UE 100.

In step S102, in response to receiving the SN Addition Request message, the SN 200S may transmit an SN Addition Request Ack message to the MN 200M to acknowledge the preparation of resources for DC operation for the UE 100.

In step S103, the UE 100 may receive a reference signal from each cell, measure, based on the reference signal, the radio quality, and transmit a Measurement Report message including the measurement result to the MN 200M. Here, it is assumed that the Measurement Report message includes the measurement results of the THz wave cell. The receiver 220 of the MN 200M receives the Measurement Report message.

In step S104, the MN 200M may transmit a message (for example, an SN Modification Request message) to the SN 200S to request deactivation of the SCG and to configure conditional SCG activation to the UE 100. The SN 200S receives the message. The message may include an identifier of the UE 100, specifically, an identifier for identifying the UE 100 on the inter-node interface. The message may include information notifying that it is conditional SCG activation or information requesting configuration of conditional SCG activation. When the SN 200S requests configuration of conditional SCG activation, the message may include configuration information for conditional SCG activation.

In step S105, the SN 200S may transmit a message indicating acknowledgement of the message of step S104 (for example, an SN Modification Request Ack message) to the MN 200M. The MN 200M receives the message. The message may include information about resources (for example, SCG and bearers) prepared by the SN 200S, for example, information about the PSCell and information about the SCell of the SCG. The message may include configuration information regarding a reference signal of the SCG (PSCell). This information may be transmitted from the MN 200M to the UE 100 in step S106.

In step S106, the MN 200M generates an RRC Reconfiguration message and transmits the RRC Reconfiguration message to the UE 100. The UE 100 receives the RRC Reconfiguration message. The RRC Reconfiguration message includes information for configuring the SCG and configuration information for conditional SCG activation. The information for configuring the SCG includes information about the PSCell and information about the SCell of the SCG. The configuration information for conditional SCell activation includes information indicating a radio quality condition to be satisfied for the UE 100 to activate the corresponding SCG. The information indicating the radio quality condition may include at least one radio quality threshold value selected from the group consisting of an RSRP threshold value, an RSRQ threshold value, and an SINR threshold value.

In the first embodiment, the initial state of the SCG configured in the UE 100 is a deactive state. The UE 100 starts, based on configuration information for conditional SCG activation, radio quality measurement for the SCG (specifically, the PSCell).

In step S107, the UE 100 generates an RRC Reconfiguration Complete message and transmits the RRC Reconfiguration Complete message to the MN 200M. The MN 200M receives the RRC Reconfiguration Complete message.

In step S108, the UE 100 receives a reference signal of the PSCell and measures, based on the reference signal, the radio quality of the PSCell. The reference signal of the PSCell may be a demodulation reference signal (DMRS) included in an SSB (SS/PBCH Block) transmitted by the PSCell or may be a tracking reference signal (TRS), which is a type of CSI-RS.

In step S109, the UE 100 determines whether the radio quality condition set in step S106 is satisfied. Specifically, the UE 100 compares the measurement result (RSRP, RSRQ, and/or SINR) of step S108 with the radio quality threshold value set in step S106, and if the measurement result exceeds the radio quality threshold value, determines that the radio quality condition is satisfied. If it is determined that the radio quality condition is not satisfied (step S109: NO), processing returns to step S108.

On the other hand, if it is determined that the radio quality condition is satisfied (step S109: YES), in step S110, the UE 100 autonomously starts activation of the SCG. Here, the UE 100 may perform control to establish time/frequency synchronization with each cell of the SCG. For example, the UE 100 receives an SSB or TRS of each cell of the SCG and establishes time/frequency synchronization by using the SSB or TRS. The UE 100 may perform CSI measurement, AGC, and beam management for each cell of the SCG.

Note that, in steps S108 and S110, the SN 200S may transmit TRS on the PSCell at timing (an opportunity) that the MN 200M has previously configured in the UE 100, and the UE 100 may wake up at that timing to receive the TRS. Information about the timing (opportunity) may be included in the RRC configuration in step S106.

In step S111, the UE 100 triggers the transmission of an SCG activation notification and transmits the SCG activation notification to the MN 200M. The SCG activation notification may be a newly introduced MAC CE. Alternatively, the SCG activation notification may be a notification included in UCI transmitted on the PUCCH, may be a PDCP Control PDU, or may be a notification included in an RRC message. The MN 200M receives the SCG activation notification. In response to receiving the SCG activation notification, the MN 200M recognizes that the SCG of the UE 100 has become available. The SCG activation notification may include an index (which may be a cell ID) of each cell of the activated SCG. The index may refer to each entry of the cell list of the SCG configured in the RRC Reconfiguration message in step S106.

Prior to transmitting the SCG activation notification, the following processing may be performed in the PHY layer and the MAC layer. Specifically, the UE 100 transmits a Scheduling Request (SR) to the MN 200M, the MN 200M transmits a UL grant for a Buffer Status Report (BSR) to the UE 100, the UE 100 transmits a BSR to the MN 200M, and the MN 200M transmits a UL grant for transmitting a PUSCH to the UE 100. Then, the UE 100 transmits, based on the UL grant for PUSCH transmission, an SCG activation notification.

In step S112, the MN 200M may transmit a message (for example, an SN Modification Request message) to the SN 200S to notify that the UE 100 has activated the SCG. The SN 200S receives the message. The message may include an identifier of the UE 100, specifically, an identifier for identifying the UE 100 on the inter-node interface.

In step S113, the SN 200S may transmit a message indicating acknowledgement of the message of step S112 (for example, an SN Modification Request Ack message) to the MN 200M. The MN 200M receives the message.

In step S114, the UE 100 starts wireless communication (data communication) with the SN 200S by using the activated SCG. Here, the SN 200S performs DL transmission and/or UL grant to the UE 100 in each cell of the activated SCG and performs wireless communication (data communication) on the SCG.

Note that, in this operation example, an example has been described in which the UE 100 transmits an SCG activation notification to the MN 200M, but if SCG activation has been completed, the SCG activation notification may be transmitted to the MN 200M on the SCG (for example, PSCell).

In this operation example, the MN 200M transmits a message to the SN 200S to configure conditional SCG activation to the UE 100, and the SN 200S transmits a response message to the message. Meanwhile, the SN 200S may autonomously transmit a message to the MN 200M to configure conditional SCG activation to the UE 100. In this case, the message may include information notifying that it is conditional SCG activation or information requesting configuration of conditional SCG activation. When the SN 200S requests configuration of conditional SCG activation, the message may include configuration information for conditional SCG activation.

(2) Second Embodiment

A second embodiment will be described with reference to FIGS. 10 and 11, focusing mainly on the differences from the first embodiment.

(2.1) BWP

Figure 10:
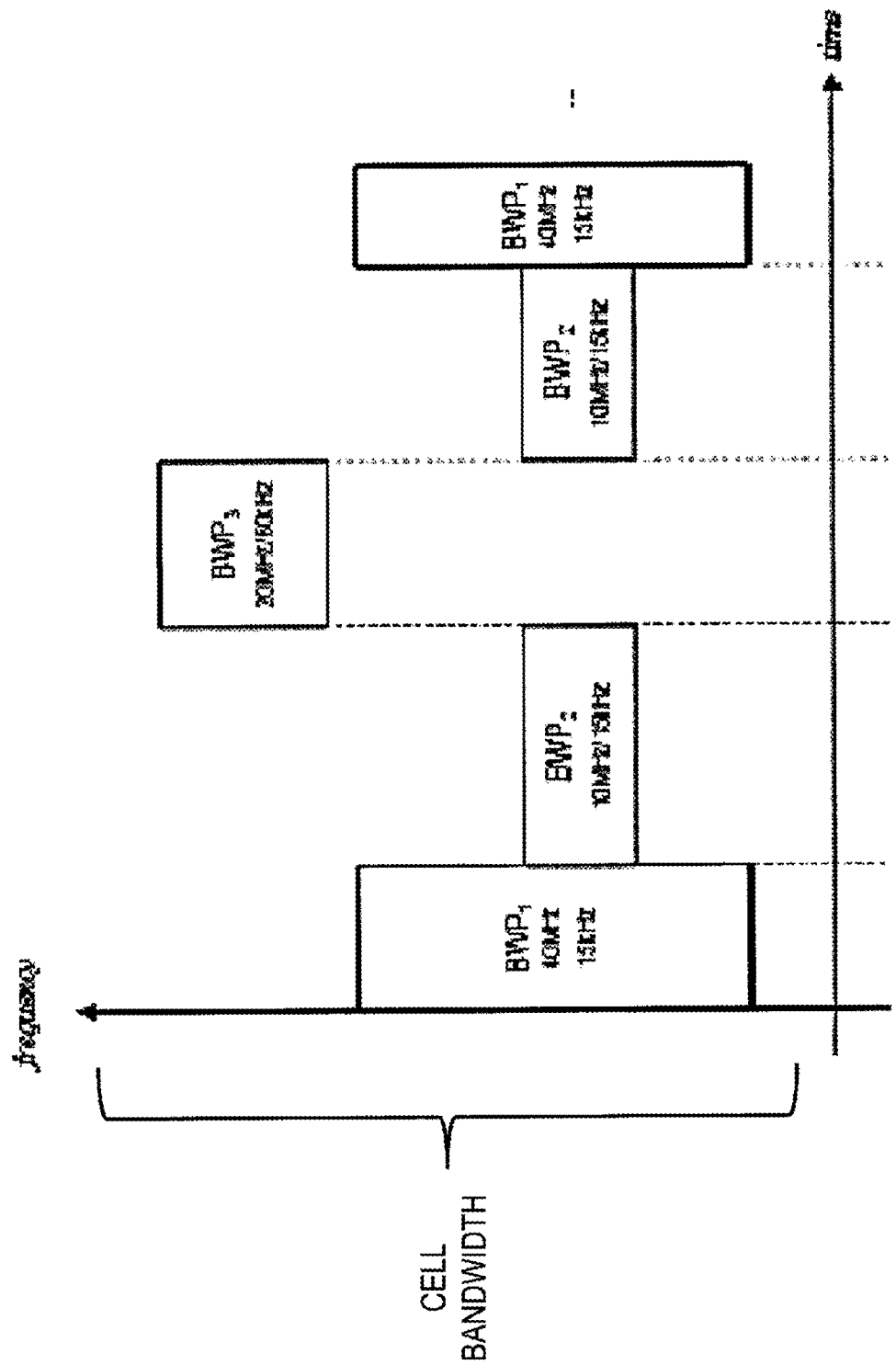
FIG. 10 is a diagram for describing a bandwidth portion (BWP).

FIG. 10 is a diagram for describing a BWP.

Bandwidth Adaptation (BA) allows the transmission and reception bandwidth of the UE 100 to be adjusted without needing to be as large as the bandwidth of the cell. The portion of the cell bandwidth is referred to as a BWP. In BA, the node 200 configures one or more BWPs within the cell to the UE 100 and notifies the UE 100 which of the configured BWPs is currently active. The BWP includes an initial BWP to be used for initial access and a dedicated BWP to be individually configured to the UE 100. The bandwidth and subcarrier spacing of each BWP can be variably set.

In the illustrated example, three different BWPs are configured in the UE 100, and an example is shown in which the active BWP is switched between these BWPs. BWP1 has a width of 40 MHz and a subcarrier spacing of 15 kHz, BWP2 has a width of 10 MHz and a subcarrier spacing of 15 kHz, and BWP3 has a width of 20 MHz and a subcarrier spacing of 60 KHz.

In each of the UL and DL, there is only one BWP in the active state, and the rest are in the deactive state. In a deactive BWP, the UE 100 does not monitor the PDCCH and does not transmit the PUCCH, the PRACH, or the UL-SCH.

In the current 3GPP technical specifications, in the case of carrier aggregation (CA), the node 200 can configure a BWP in a dormant state (dormant BWP) for the SCell. When the active BWP of the activated SCell is a BWP in a dormant state, the UE 100 stops PDCCH monitoring and SRS/PUSCH/PUCCH transmission in the SCell, but continues to perform CSI measurement, AGC, and beam management. PDCCH/DCI is used to control entering and leaving the dormant BWP for the SCell. Note that the dormant BWP is one of the dedicated BWPs of the UE 100 that is configured by the node 200 via dedicated RRC signaling.

In the second embodiment, a case is assumed in which the dormant BWP can be set in the PSCell.

(2.2) Operation Example of System

The UE 100 according to the second embodiment performs wireless communication with the MN 200M and the SN 200S by using DC, similarly to the first embodiment. In the second embodiment, the activation processing for the SCG includes a dormant leaving process that switches a BWP in a dormant state in a PSCell to a non-dormant state. Specifically, according to the second embodiment, the UE 100 leaves the dormant state for the BWP in the dormant state in the PSCell in the active state in response to the radio quality condition configured by the MN 200M being satisfied.

Figure 11:
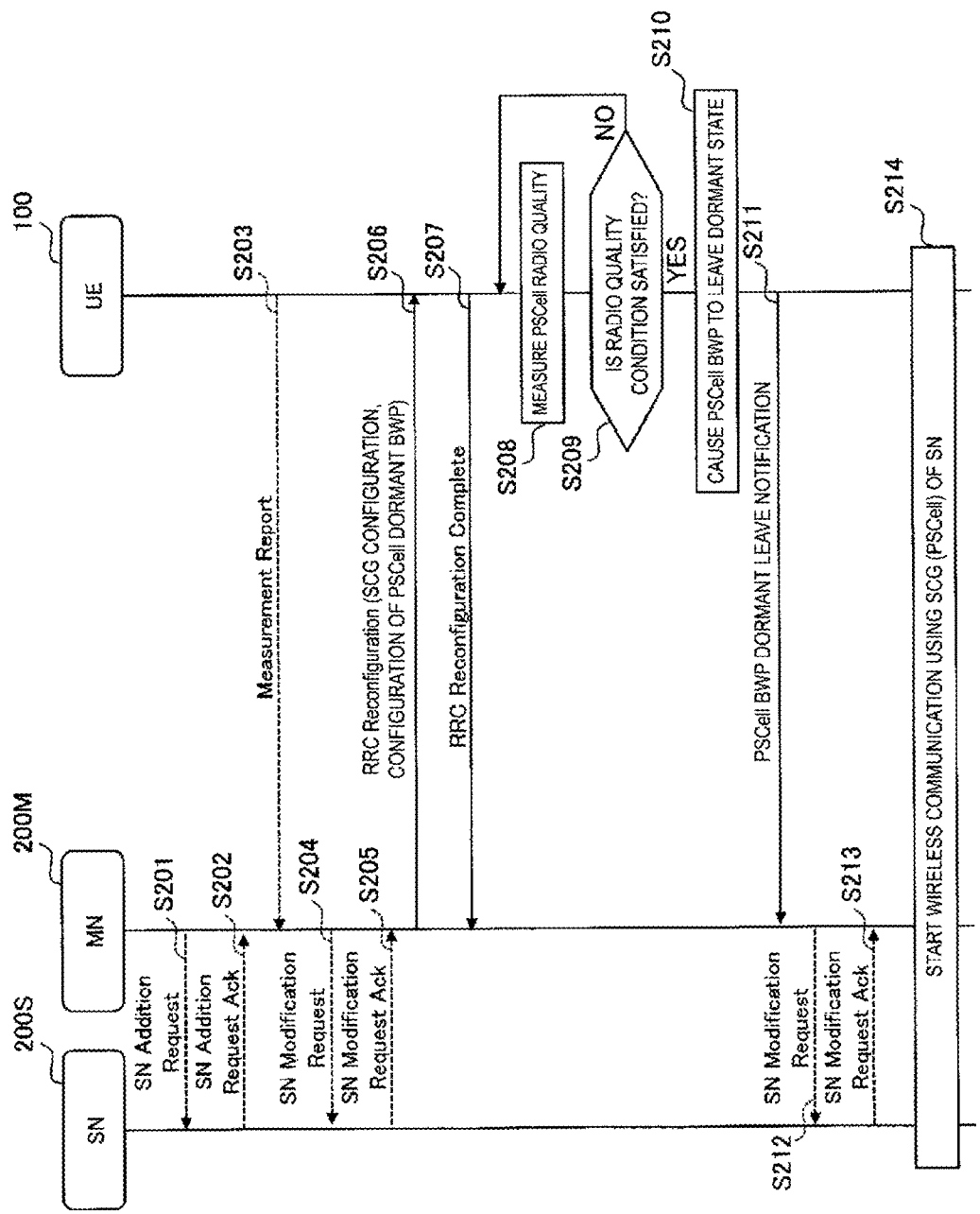
FIG. 11 is a diagram illustrating an operation example of a system according to a second embodiment.

FIG. 11 is a diagram illustrating an operation example of a system according to the second embodiment. In FIG. 11, non-essential steps are indicated by dashed lines. Duplicated descriptions of operations similar to those in the first embodiment will be omitted.

The operations from step S201 to step S205 are similar to those in the first embodiment (FIG. 9).

In step S206, the MN 200M transmits an RRC Reconfiguration message to the UE 100. The UE 100 receives the RRC Reconfiguration message. In the second embodiment, the RRC Reconfiguration message includes information for configuring an SCG, information for configuring a dormant BWP in a PSCell, and configuration information for leaving a conditional dormant BWP. The configuration information for leaving a conditional dormant BWP includes information indicating radio quality conditions to be satisfied to end (leave) the dormant state of an active BWP of a corresponding active PSCell when the active BWP is a dormant BWP. The information indicating the radio quality condition may include at least one radio quality threshold value selected from the group consisting of an RSRP threshold value, an RSRQ threshold value, and an SINR threshold value.

In the second embodiment, the initial state of the active BWP of the PSCell configured in the UE 100 is the dormant state. The UE 100 starts, based on configuration information for leaving a conditional dormant BWP, measuring radio quality for the PSCell. The UE 100 may autonomously deactivate an SCell of an SCG when the active BWP of the PSCell is a dormant BWP.

In step S207, the UE 100 transmits the RRC Reconfiguration Complete message to the MN 200M. The MN 200M receives the RRC Reconfiguration Complete message.

In step S208, the UE 100 receives a reference signal of the PSCell and measures, based on the reference signal, the radio quality of the PSCell.

In step S209, the UE 100 determines whether the radio quality condition set in step S206 is satisfied. Specifically, the UE 100 compares the measurement result (RSRP, RSRQ, and/or SINR) of step S208 with the radio quality threshold value set in step S206, and if the measurement result exceeds the radio quality threshold value, determines that the radio quality condition is satisfied. If it is determined that the radio quality condition is not satisfied (step S209: NO), processing returns to step S208.

On the other hand, if it is determined that the radio quality condition is satisfied (step S209: YES), in step S210, the UE 100 autonomously ends (leaves) the dormant BWP of the PSCell (that is, switches the active BWP of the PSCell to a non-dormant state). The UE 100 may leave dormant for the active BWP of the PSCell and autonomously activate the SCell of the SCG.

In step S211, the UE 100 triggers the transmission of a PSCell BWP dormant leave notification and transmits the PSCell BWP dormant leave notification to the MN 200M. The MN 200M receives the PSCell BWP dormant leave notification. The PSCell BWP dormant leave notification may be a newly introduced MAC CE. Alternatively, the PSCell BWP dormant leave notification may be a notification included in UCI transmitted on the PUCCH, may be a PDCP Control PDU, or may be a notification included in an RRC message.

Prior to transmitting the PSCell BWP dormant leave notification, the following processing may be performed in the PHY layer and the MAC layer. Specifically, the UE 100 transmits an SR to the MN 200M, the MN 200M transmits a UL grant for a BSR to the UE 100, the UE 100 transmits a BSR to the MN 200M, and the MN 200M transmits a UL grant for transmitting a PUSCH to the UE 100. Then, the UE 100 transmits, based on the UL grant for PUSCH transmission, a PSCell BWP dormant leave notification.

In step S212, the MN 200M may transmit a message (for example, an SN Modification Request message) to the SN 200S to notify that the UE 100 has left dormant for the active BWP of the PSCell. The SN 200S receives the message. The message may include an identifier of the UE 100, specifically, an identifier for identifying the UE 100 on the inter-node interface.

In step S213, the SN 200S may transmit a message indicating acknowledgement of the message of step S212 (for example, an SN Modification Request Ack message) to the MN 200M. The MN 200M receives the message.

In step S214, the UE 100 starts wireless communication (data communication) with the SN 200S by using the active BWP of the PSCell (and the SCell of the SCG). Here, the SN 200S performs DL transmission and/or UL grant to the UE 100 in each cell of the SCG including the PSCell and performs wireless communication (data communication) on the SCG.

Note that, in this operation example, an example has been described in which the UE 100 transmits a PSCell BWP dormant leave notification to the MN 200M, but the PSCell BWP dormant leave notification may be transmitted to the SN 200S on the PSCell.

(3) Third Embodiment

A third embodiment will be described with reference to FIG. 12, focusing mainly on the differences from the above-described embodiments. The third embodiment is an embodiment based on the above-described first embodiment. However, the third embodiment may be an embodiment based on the above-described second embodiment.

In the third embodiment, the UE 100 completes activation of the SCG (that is, makes the SCG available for data communication) within a predetermined time from the timing when the UE 100 transmits an SCG activation notification or the timing when the UE 100 receives an acknowledgment (HARQ ACK) to the SCG activation notification from the MN 200M. On the other hand, the MN 200M considers the activation processing to be completed within a predetermined time from the timing when receiving the SCG activation notification or the timing when transmitting an acknowledgment (HARQ ACK) to the SCG activation notification to the UE 100. Thus, the MN 200M can smoothly start data communication on the SCG after SCG activation is completed.

In the third embodiment, the transmitter 120 of the UE 100 may transmit information indicating a predetermined time to the MN 200M when transmitting the SCG activation notification or before transmitting the SCG activation notification. The receiver 220 of the MN 200M receives information indicating a predetermined time from the UE 100. Thus, the MN 200M can properly know the timing when the UE 100 completes SCG activation and smoothly start data communication on the SCG. Hereinafter, the predetermined time is also referred to as a "time offset".

Figure 12:
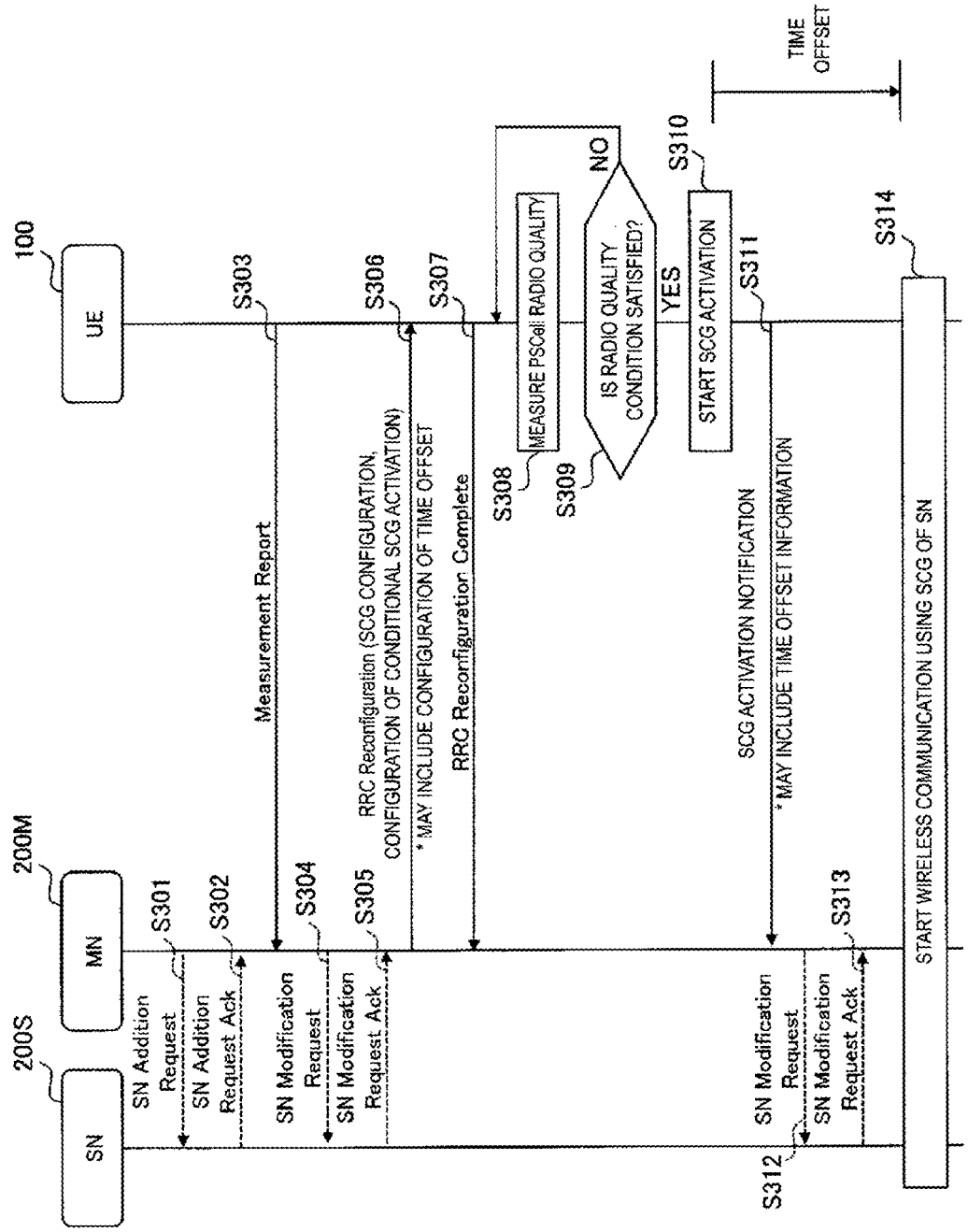
FIG. 12 is a diagram illustrating an operation example of a system according to a third embodiment.

FIG. 12 is a diagram illustrating an operation example of a system according to the third embodiment. In FIG. 12, non-essential steps are indicated by dashed lines. Duplicated descriptions of operations similar to those in the first embodiment will be omitted.

The operations from step S301 to step S305 are similar to those in the first embodiment (FIG. 9).

In step S306, the MN 200M transmits an RRC Reconfiguration message to the UE 100. The receiver 110 of the UE 100 receives the RRC Reconfiguration message.

In the third embodiment, the RRC Reconfiguration message may include, in addition to the information described in the above-described first embodiment, configuration information for configuring a time offset from the time of transmitting an SCG activation notification (or an acknowledgment to the notification) to the time of completing the SCG activation processing. The time offset may be in units of milliseconds (for example, X ms) or in units of a radio frame configuration (for example, X frames, X subframes, X slots, X OFDM symbols).

The operations from step S307 to step S310 are similar to those in the first embodiment (FIG. 9).

In step S311, the UE 100 transmits an SCG activation notification to the MN 200M. The receiver 220 of the MN 200M receives the SCG activation notification.

In the third embodiment, the SCG activation notification may include information indicating a time offset. At the timing of transmitting the SCG activation notification, the UE 100 determines how much time is required until SCG activation is completed and notifies the MN 200M of the time as a time offset.

Alternatively, the UE 100 may notify the network 1 in advance of information indicating a time offset determined according to the capability of the UE 100. For example, the MN 200M transmits an inquiry message (UE Capability Enquiry message) to the UE 100 to inquire about the capabilities of the UE 100. In response to receiving the UE Capability Enquiry message, the UE 100 transmits a UE capability information message including time offset information to the MN 200M.

The MN 200M recognizes that the SCG of the UE 100 becomes available at the timing when the SCG activation notification is received or after a time offset from the timing when the HARQ ACK is transmitted for the SCG activation notification. The time offset may be a variable time offset set in step S306, a variable time offset notified in step S311, or a fixed time offset predefined in the 3GPP technical specifications.

The operations from step S312 to step S314 are similar to those in the first embodiment (FIG. 9).

(4) Fourth Embodiment

A fourth embodiment will be described with reference to FIGS. 13 and 14, focusing mainly on the differences from the above-described embodiments. The fourth embodiment is an embodiment based on the above-described first embodiment. However, the fourth embodiment may be an embodiment based on the above-described second embodiment.

In the above-described embodiments, the UE 100 detects that the radio quality of the PSCell satisfies a predetermined quality and performs SCG activation or leaves a dormant BWP. Here, in order to quickly detect that the radio quality of the PSCell has satisfied a predetermined quality, it is desirable that the UE 100 be able to constantly measure the radio quality of the PSCell. In the above-described embodiments, the UE 100 measures the radio quality (RSRP or the like) using the SSB or TRS (CSI-RS) as a reference signal, but these reference signals are transmitted discretely in time. Therefore, at the timing when SSB or CSI-RS is not being transmitted, the UE 100 cannot measure wireless communication, and a delay may occur in detecting that the radio quality of PSCell satisfies a predetermined quality.

When the SCG is activated, the UE 100 uses the SSB or TRS (CSI-RS) as a reference signal to establish time/frequency synchronization and perform processes such as CSI measurement, AGC, and beam management. Therefore, at the timing when SSB or CSI-RS is not being transmitted, the UE 100 cannot perform processing for SCG activation, and a delay may occur when activating SCG.

Therefore, in the fourth embodiment, the SN 200S temporally and continuously transmits, on the PSCell, a reference signal (also referred to as "Fast tracking RS") to be used for measuring radio quality. The SN 200S may transmit, based on a request and/or settings from the MN 200M, the Fast Tracking RS. The UE 100 receives the Fast tracking RS temporally and continuously transmitted on the PSCell. The UE 100 measures, based on the Fast tracking RS, the radio quality of the PSCell. The UE 100 may perform, based on the Fast tracking RS, processing for SCG activation (for example, at least one selected from the group consisting of establishment of time/frequency synchronization, CSI measurement, AGC, and beam management). This makes it possible to suppress the above-described delay.

Figure 13:
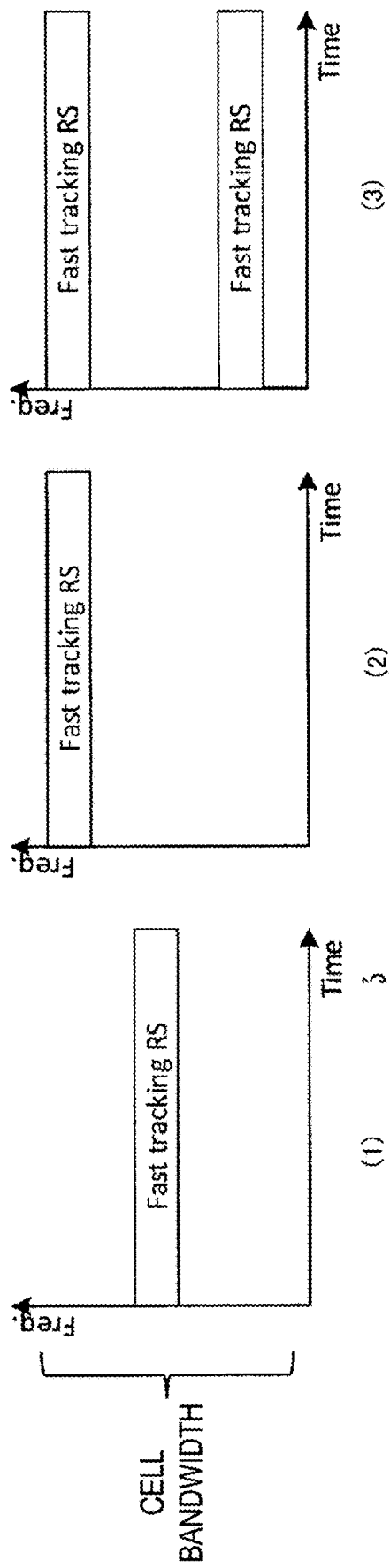
FIG. 13 is a diagram illustrating a specific example of a reference signal (Fast tracking RS) according to a fourth embodiment.

FIG. 13 is a diagram illustrating a specific example of a Fast tracking RS according to the fourth embodiment. The Fast tracking RS according to the fourth embodiment is arranged in some frequency resources of the bandwidth of the PSCell.

In the example of (1) in FIG. 13, the Fast Tracking RS is arranged in one or more resource blocks in the center of the bandwidth of the PSCell, or in one or more subcarriers in the center of the bandwidth of the PSCell. In the example of (2) in FIG. 13, the Fast Tracking RS is arranged in one or more resource blocks on one end side of the bandwidth of the PSCell, or in one or more subcarriers on one end side of the bandwidth of the PSCell. In the example of (3) in FIG. 13, the Fast Tracking RS is arranged in one or more resource blocks on both ends of the bandwidth of the PSCell, or in one or more subcarriers on both ends of the bandwidth of the PSCell.

Figure 14:
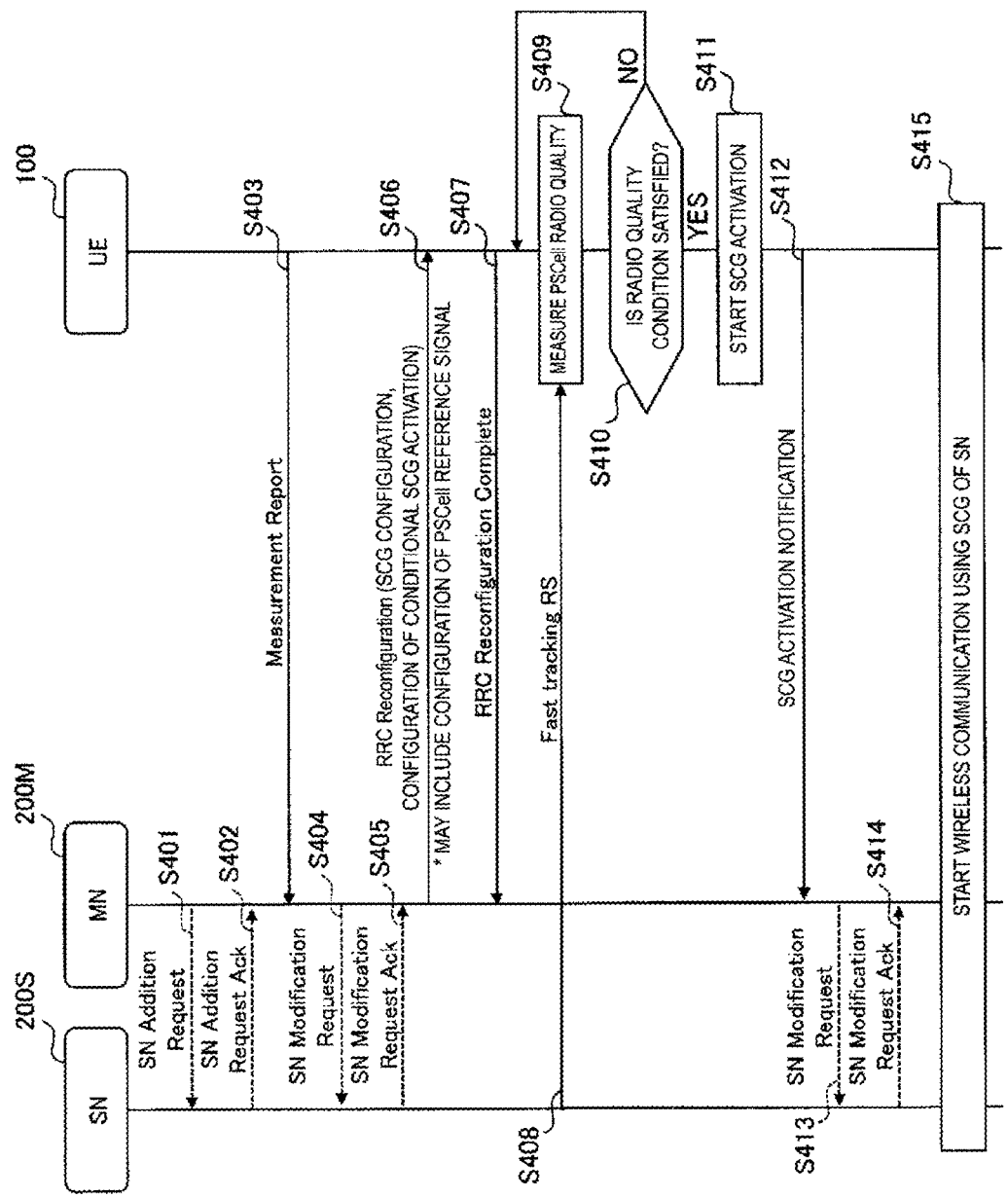
FIG. 14 is a diagram illustrating an operation example of a system according to the fourth embodiment.

FIG. 14 is a diagram illustrating an operation example of a system according to the fourth embodiment. In FIG. 14, non-essential steps are indicated by dashed lines. Duplicated descriptions of operations similar to those in the first embodiment will be omitted.

The operations from step S401 to step S405 are similar to those in the first embodiment (FIG. 9).

In step S406, the MN 200M transmits an RRC Reconfiguration message to the UE 100. The UE 100 receives the RRC Reconfiguration message.

In the fourth embodiment, the RRC Reconfiguration message may include configuration information regarding the Fast tracking RS in addition to the information described in the above-described first embodiment. The configuration information regarding the fast tracking RS includes at least one selected from the group consisting of information indicating the presence or absence of a fast tracking RS, information indicating the position of the fast tracking RS on the frequency axis (for example, a resource block number, a subcarrier number, and/or an Absolute Radio-Frequency Channel Number (ARFCN)), and information assisting in demodulation of the fast tracking RS (for example, a root sequence number indicating a signal sequence of a reference signal, and the like).

Alternatively, the SN 200S or the MN 200M may broadcast configuration information regarding the Fast tracking RS in a system information block (SIB).

In step S407, the UE 100 transmits the RRC Reconfiguration Complete message to the MN 200M. The MN 200M receives the RRC Reconfiguration Complete message.

In step S408, the SN 200S transmits a stationary Fast Tracking RS on the time axis in the PSCell that is the target of high-speed detection. The UE 100 receives the Fast tracking RS on the PSCell.

In step S409, the UE 100 measures, based on the Fast tracking RS, the radio quality of the PSCell.

In step S410, the UE 100 determines whether the radio quality condition set in step S406 is satisfied. If it is determined that the radio quality condition is not satisfied (step S410: NO), processing returns to step S409.

If it is determined that the radio quality condition is satisfied (step S410: YES), in step S411, the UE 100 starts activation of the SCG. Here, the SN 200S transmits a stationary Fast Tracking RS on the time axis in the PSCell. The UE 100 may perform control for establishing time/frequency synchronization with the PSCell by using the Fast tracking RS. The controller 130 of the UE 100 may perform CSI measurement, AGC, and beam management for the PSCell by using the Fast tracking RS.

The operations from step S412 to step S415 are similar to those in the first embodiment (FIG. 9).

(5) Other Embodiments

The above-described first to fourth embodiments may be implemented independently, or two or more of the embodiments may be combined and implemented.

In the above embodiments, an example in which the cells of the SCG are THz wave cells has been mainly described, but the cells of the SCG are not limited to THz wave cells. For example, the cells of the SCG may be mmW cells.

The operational flows in the above-described embodiments do not necessarily have to be executed in chronological order according to the order described in the flow diagrams. For example, steps in the operations may be performed in a different order than that described in the flow diagrams or may be performed in parallel. Some of the steps in the operations may be removed and additional steps may be added to the process.

A program may be provided that causes a computer (the UE 100, the node 200) to execute the operations according to the above-described embodiments. The program may be recorded on a computer-readable medium. The computer-readable medium allows the program to be installed on a computer. Here, the computer-readable medium on which the program is recorded may be a non-transitory recording medium. The non-transitory recording medium is not particularly limited, but may be, for example, a recording medium such as a CD-ROM or a DVD-ROM.

As used in the present disclosure, the phrases "based on" and "depending on/in response to" do not mean "based only on" or "only depending on/only in response to", unless expressly stated otherwise. The phrase "based on" means both "based only on" and "based at least in part on". Similarly, the phrase "depending on/in response to" means both "only depending on/only in response to" and "at least partially depending on/at least partially in response to". The terms "include", "comprise", and variations thereof do not mean to include only the items listed, but may include only the items listed, or may include additional items in addition to the items listed. As used in the present disclosure, the term "or" is not intended to be an exclusive or. Any reference to an element using a designation such as "first", "second", and the like as used in the present disclosure does not generally limit the quantity or order of those elements. These designations may be used herein as a convenient method of distinguishing between two or more elements. Thus, a reference to first and second elements does not mean that only two elements may be employed therein or that the first element needs to precede the second element in some way. In the present disclosure, when articles are added by translation, such as, for example, a, an, and the in English, these articles are intended to include the plural unless the context clearly indicates otherwise.

Although the embodiments have been described above in detail with reference to the drawings, the specific configuration is not limited to that described above, and various design changes, and the like are possible without departing from the spirit of the invention.

(6) Supplementary Notes

Features relating to the embodiments described above are described below as supplementary notes.

Supplementary Note 1

A user equipment that performs wireless communication with a master node and a secondary node by using dual connectivity in a mobile communication system, the user equipment including:

a receiver configured to receive, from the master node, information indicating a radio quality condition to be satisfied for the user equipment to perform activation processing for a secondary cell group of the secondary node; and a controller configured to measure radio quality for the secondary cell group and evaluate whether the radio quality condition is satisfied, wherein the controller is configured to perform the activation processing for the secondary cell group in response to the radio quality condition being satisfied.

Supplementary Note 2

The user equipment according to Supplementary Note 1, wherein the activation processing includes processing of causing the secondary cell group in a deactive state to transition to an active state.

Supplementary Note 3

The user equipment according to Supplementary Note 1 or 2, wherein the activation processing includes processing of leaving a bandwidth portion in a dormant state in a primary cell of the secondary cell group.

Supplementary Note 4

The user equipment according to any one of Supplementary Notes 1 to 3, further including a transmitter configured to transmit a notification regarding the activation processing to the master node in response to the radio quality condition being satisfied.

Supplementary Note 5

The user equipment according to Supplementary Note 4, wherein the controller is configured to complete the activation processing within a predetermined time from timing when the notification is transmitted or timing when an acknowledgment to the notification is received from the master node.

Supplementary Note 6

The user equipment according to Supplementary Note 5, wherein the transmitter is configured to transmit information indicating the predetermined time to the master node when transmitting the notification or before transmitting the notification.

Supplementary Note 7

The user equipment according to any one of Supplementary Notes 1 to 6, wherein the receiver is configured to receive a reference signal transmitted temporally and continuously from the secondary node on a primary cell of the secondary cell group, and the controller is configured to measure, based on the reference signal, the radio quality.

Supplementary Note 8

A node that operates as a master node in a mobile communication system wherein a user equipment performs wireless communication with the master node and a secondary node by using dual connectivity, the node including:
- a controller configured to configure a secondary cell group of the secondary node to the user equipment; and
- a transmitter configured to transmit, to the user equipment, information indicating a radio quality condition to be satisfied for the user equipment to perform activation processing for the secondary cell group.

Supplementary Note 9

The node according to Supplementary Note 8, wherein the activation processing includes processing of causing the secondary cell group in a deactive state to transition to an active state.

Supplementary Note 10

The node according to Supplementary Note 8 or 9, wherein the activation processing includes processing of leaving a bandwidth portion in a dormant state in a primary cell of the secondary cell group.

Supplementary Note 11

The node according to any one of Supplementary Notes 8 to 10, further including a receiver configured to receive a notification regarding the activation processing from the user equipment in response to the radio quality condition being satisfied in the user equipment.

Supplementary Note 12

The node according to Supplementary Note 11, wherein the controller is configured to consider the activation processing to be completed within a predetermined time from timing when the notification is transmitted or timing when an acknowledgment to the notification is received from the node.

Supplementary Note 13

The node according to Supplementary Note 12, wherein the receiver is configured to receive information indicating the predetermined time from the user equipment when receiving the notification or before receiving the notification.

Supplementary Note 14

A communication method to be used in a user equipment that performs wireless communication with a node by using dual connectivity in a mobile communication system, the communication method including:
- receiving, from the node, information indicating a radio quality condition to be satisfied for the user equipment to perform activation processing for a secondary cell group to be configured to the user equipment;
- measuring radio quality for the secondary cell group and evaluating whether the radio quality condition is satisfied; and
- performing the activation processing for the secondary cell group in response to the radio quality condition being satisfied.

Supplementary Note 15

A communication method to be used in a node that performs wireless communication with a user equipment by using dual connectivity in a mobile communication system, the communication method including:
- configuring a secondary cell group to the user equipment; and
- transmitting, to the user equipment, information indicating a radio quality condition to be satisfied for the user equipment to perform activation processing for the secondary cell group.

REFERENCE SIGNS

1: Network
10: RAN
20: CN
100: UE
110: Receiver
120: Transmitter
130: Controller
140: Wireless communicator
200: Node
210: Transmitter
220: Receiver
230: Controller
240: NW communicator
250: Wireless communicator
300: CN apparatus

The invention claimed is:

1. A user equipment that performs wireless communication with a master node and a secondary node by using dual connectivity in a mobile communication system, the user equipment comprising:
- a receiver configured to receive, from the master node, information indicating a radio quality condition to be satisfied for the user equipment to perform activation processing for a secondary cell group of the secondary node; and
- a controller configured to measure radio quality for the secondary cell group and evaluate whether the radio quality condition is satisfied, while the user equipment is in an RRC connected state with the master node in accordance with 3GPP (the 3rd Generation Partnership Project) standard,
- wherein the controller is configured to perform the activation processing for the secondary cell group in response to the radio quality condition being satisfied, when the secondary cell group has been configured to the user equipment and is in a deactive state introduced in Release 17 of 3GPP standard.

2. The user equipment according to claim 1, wherein
- the receiving of the information indicating the radio quality condition, the measuring of the radio quality, and the evaluating of whether the radio quality condition is satisfied are performed when the user equipment is in an RRC (a radio resource control) connected state; and
- the activation processing includes processing of causing the secondary cell group in a deactive state to transition to an active state when the user equipment is in the RRC connected state.

3. The user equipment according to claim 1, wherein the deactive state is a state where all secondary cells of the secondary cell group are deactive.

4. The user equipment according to claim 1, wherein, while the secondary cell group is in the deactive state, the controller is configured to control not to transmit, on the secondary cell group, a physical uplink shared channel (PUSCH), a sounding reference signal (SRS), and a channel quality indicator (CSI) report.

5. The user equipment according to claim 1, wherein, while the secondary cell group is in the deactive state, the controller is configured to control not to perform, on the secondary cell group, monitoring of a physical downlink control channel (PDCCH) and reception of a downlink shared channel (DL-SCH).

6. The user equipment according to claim 1, wherein, while the secondary cell group is in the deactive state, the controller is configured to control to continue radio link monitoring (RLM) and measurement reporting on a PSCell of the secondary cell group.

7. The user equipment according to claim 1, wherein, when causing the secondary cell group to transition to the active state, the controller is configured to skip a random access procedure if a timing advance (TA) with a PSCell of the secondary cell group is valid.

8. The user equipment according to claim 1, further comprising a transmitter configured to transmit a notification regarding the activation processing to the master node in response to the radio quality condition being satisfied.

9. A node that operates as a master node in a mobile communication system in which a user equipment performs wireless communication with the master node and a secondary node by using dual connectivity, the node comprising:
  a controller configured to configure a secondary cell group of the secondary node to the user equipment; and
  a transmitter configured to transmit, to the user equipment, information indicating a radio quality condition to be satisfied for the user equipment being in an RRC connected state with the master node in accordance with 3GPP (the 3rd Generation Partnership Project) standard to perform activation processing for the secondary cell group, when the secondary cell group has been configured to the user equipment and is in a deactive state introduced in Release 17 of 3GPP standard.

10. The node according to claim 9, wherein
  the configuring of the secondary cell group and the transmitting of the information indicating the radio quality condition are performed when the user equipment is in an RRC connected state; and
  the activation processing includes processing of causing the secondary cell group in the deactive state to transition to an active state when the user equipment is in the RRC connected state.

11. The node according to claim 9, further including a receiver configured to receive a notification regarding the activation processing from the user equipment in response to the radio quality condition being satisfied in the user equipment.

12. A communication method to be used in a user equipment that performs wireless communication with a node by using dual connectivity in a mobile communication system, the communication method comprising:
  receiving, from the node, information indicating a radio quality condition to be satisfied for the user equipment to perform activation processing for a secondary cell group to be configured to the user equipment;
  measuring radio quality for the secondary cell group and evaluating whether the radio quality condition is satisfied, while the user equipment is in an RRC connected state with the master node in accordance with 3GPP (the 3rd Generation Partnership Project) standard; and
  performing the activation processing for the secondary cell group in response to the radio quality condition being satisfied, when the secondary cell group has been configured to the user equipment and is in a deactive state introduced in Release 17 of 3GPP standard.

13. A communication method to be used in a node that performs wireless communication with a user equipment by using dual connectivity in a mobile communication system, the communication method comprising:
  configuring a secondary cell group to the user equipment; and
  transmitting, to the user equipment, information indicating a radio quality condition to be satisfied for the user equipment being in an RRC connected state with the master node in accordance with 3GPP (the 3rd Generation Partnership Project) standard to perform activation processing for the secondary cell group, when the secondary cell group has been configured to the user equipment and is in a deactive state introduced in Release 17 of 3GPP standard.

* * * * *